US012681605B2

(12) United States Patent  
Liu et al.

(10) Patent No.: US 12,681,605 B2  
(45) Date of Patent: Jul. 14, 2026

(54) LOCATION SENSING METHOD, LOCATION SENSING DEVICE, AND INPUT TERMINAL APPARATUS

(71) Applicant: Anhui Easpeed Technology Co., Ltd., Hefei (CN)

(72) Inventors: Hong Liu, Hefei (CN); Chao Fan, Hefei (CN); Dong-Cheng Han, Hefei (CN)

(73) Assignee: Anhui Easpeed Technology Co., Ltd., Hefei (CN)

( * ) Notice: Subject to any disclaimer, the term of this patent is extended or adjusted under 35 U.S.C. 154(b) by 0 days.

(21) Appl. No.: 18/681,590

(22) PCT Filed: Aug. 5, 2022

(86) PCT No.: PCT/CN2022/110401  
§ 371 (c)(1),  
(2) Date: Feb. 6, 2024

(87) PCT Pub. No.: WO2023/016352  
PCT Pub. Date: Feb. 16, 2023

(65) Prior Publication Data  
US 2024/0329780 A1 Oct. 3, 2024

(30) Foreign Application Priority Data

Aug. 13, 2021 (CN) .......................... 202110931969.0  
Aug. 13, 2021 (CN) .......................... 202110931974.1

(51) Int. Cl.  
G06F 3/042 (2006.01)  
G02B 30/56 (2020.01)  
G06F 3/041 (2006.01)

(52) U.S. Cl.  
CPC .......... G06F 3/0421 (2013.01); G06F 3/0418 (2013.01); *G02B 30/56* (2020.01)

(58) Field of Classification Search  
CPC ................. G06F 3/0421; G06F 3/0418; G06F 2203/04101; G06F 2203/04108; G06F 3/042; G02B 30/56  
See application file for complete search history.

(56) References Cited

U.S. PATENT DOCUMENTS 8,416,217 B1* 4/2013 Eriksson ............... G06F 1/1616  
178/18.09  
9,696,852 B2* 7/2017 Youn ...................... G06F 3/0421  
(Continued)

FOREIGN PATENT DOCUMENTS

CN 102262301 A 11/2011  
CN 110825218 A 2/2020  
(Continued)

*Primary Examiner* — William Lu  
(74) *Attorney, Agent, or Firm* — ScienBiziP, P.C.

(57) ABSTRACT

A location sensing method, a location sensing device, and an input terminal apparatus are provided. The method comprises: in an initial stage, using the light intensity of a reflected light received by a receiver as an environment threshold; in a sensing stage, controlling a transmitter to sequentially emit sensing light, and converting the reflected light received by the receiver into an optical path image; denoising the optical path image; when there is an occlusion object in the optical path image, extracting the outline of the occlusion object and calculating at least one parameter of the occlusion object; removing noise points of the outline; calculating position coordinates of the occlusion object in an input sensing region; optimizing a first coordinate by using a first optimizing manner; and a main board determining an advancing depth in a direction perpendicular to the input sensing region, and identifying a touch position.

16 Claims, 20 Drawing Sheets

(56) References Cited

U.S. PATENT DOCUMENTS

| | | | | |
|---|---|---|---|---|
| 10,749,525 | B2 * | 8/2020 | Lohbihler | H05B 45/10 |
| 11,237,673 | B2 | 2/2022 | Mochizuki | |
| 11,567,611 | B2 | 1/2023 | Otsubo | |
| 12,014,008 | B2 * | 6/2024 | Irie | G06F 3/017 |
| 12,032,747 | B1 * | 7/2024 | Rivolta | G06F 3/017 |
| 2011/0248151 | A1 * | 10/2011 | Holcombe | G01S 17/46 |
| | | | | 250/221 |
| 2012/0182265 | A1 * | 7/2012 | Smith | G06F 3/042 |
| | | | | 345/175 |
| 2014/0027606 | A1 * | 1/2014 | Raynor | G06F 3/017 |
| | | | | 250/208.1 |
| 2014/0118807 | A1 | 5/2014 | Su | |
| 2014/0364218 | A1 * | 12/2014 | Holmgren | G01S 7/4811 |
| | | | | 463/31 |
| 2015/0062087 | A1 * | 3/2015 | Cho | G06F 3/0425 |
| | | | | 349/12 |
| 2015/0205399 | A1 * | 7/2015 | Kim | H04M 1/7243 |
| | | | | 345/175 |
| 2015/0309584 | A1 * | 10/2015 | Kawai | G06F 3/0425 |
| | | | | 345/158 |
| 2016/0011721 | A1 * | 1/2016 | Wong | G06F 3/0416 |
| | | | | 345/175 |
| 2016/0092062 | A1 * | 3/2016 | Miyagi | G06F 3/017 |
| | | | | 345/173 |
| 2017/0024082 | A1 * | 1/2017 | Tachibana | G06F 3/0421 |
| 2017/0277323 | A1 * | 9/2017 | Kim | G06F 3/0446 |
| 2017/0308173 | A1 * | 10/2017 | Youn | G01J 1/0411 |
| 2018/0136730 | A1 * | 5/2018 | Hayashi | G06F 3/165 |
| 2018/0180716 | A1 * | 6/2018 | McVittie | G06F 3/0423 |
| 2018/0239454 | A1 * | 8/2018 | Wu | G06F 3/042 |
| 2020/0050353 | A1 * | 2/2020 | Chiu | G06V 10/82 |
| 2020/0319720 | A1 * | 10/2020 | Murayama | G06F 3/0325 |
| 2020/0319750 | A1 * | 10/2020 | Murayama | G06F 3/04845 |
| 2021/0223906 | A1 * | 7/2021 | Eriksson | G06F 3/017 |
| 2023/0290284 | A1 * | 9/2023 | Miyazawa | G02B 27/18 |
| 2023/0316799 | A1 * | 10/2023 | Miyazawa | H05K 5/003 |
| | | | | 345/56 |

FOREIGN PATENT DOCUMENTS

| | | | | |
|---|---|---|---|---|
| CN | 111402885 | A | 7/2020 | |
| CN | 111727417 | A | 9/2020 | |
| CN | 111886567 | A | 11/2020 | |
| CN | 113227952 | A | 8/2021 | |
| EP | 2807538 | B1 | 4/2017 | |
| WO | 2018216619 | A1 | 11/2018 | |
| WO | WO-2019159760 | A1 * | 8/2019 | G06F 3/0425 |

* cited by examiner

43a

43b

4311

4312

D2

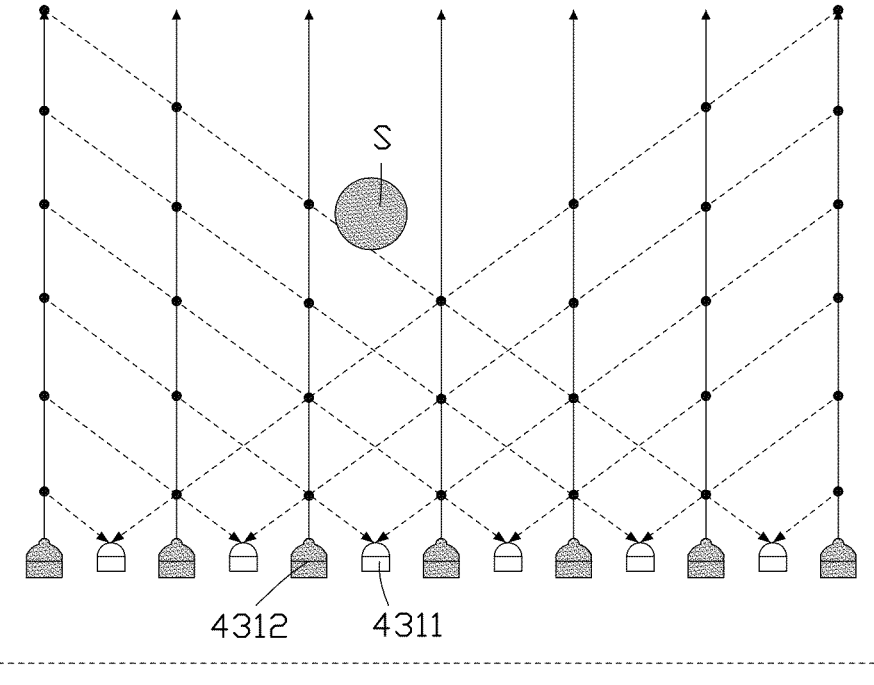
4312    4311
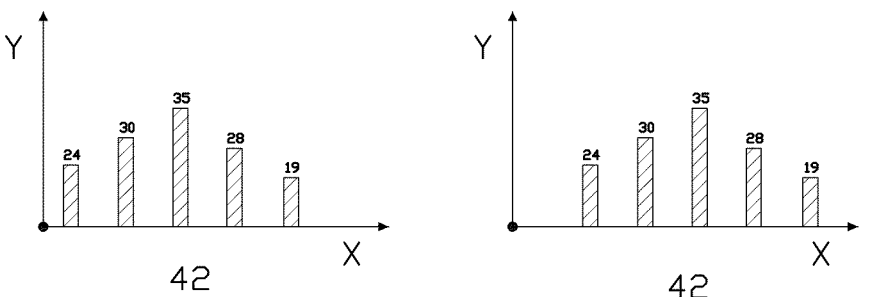
42    42
FIG. 17

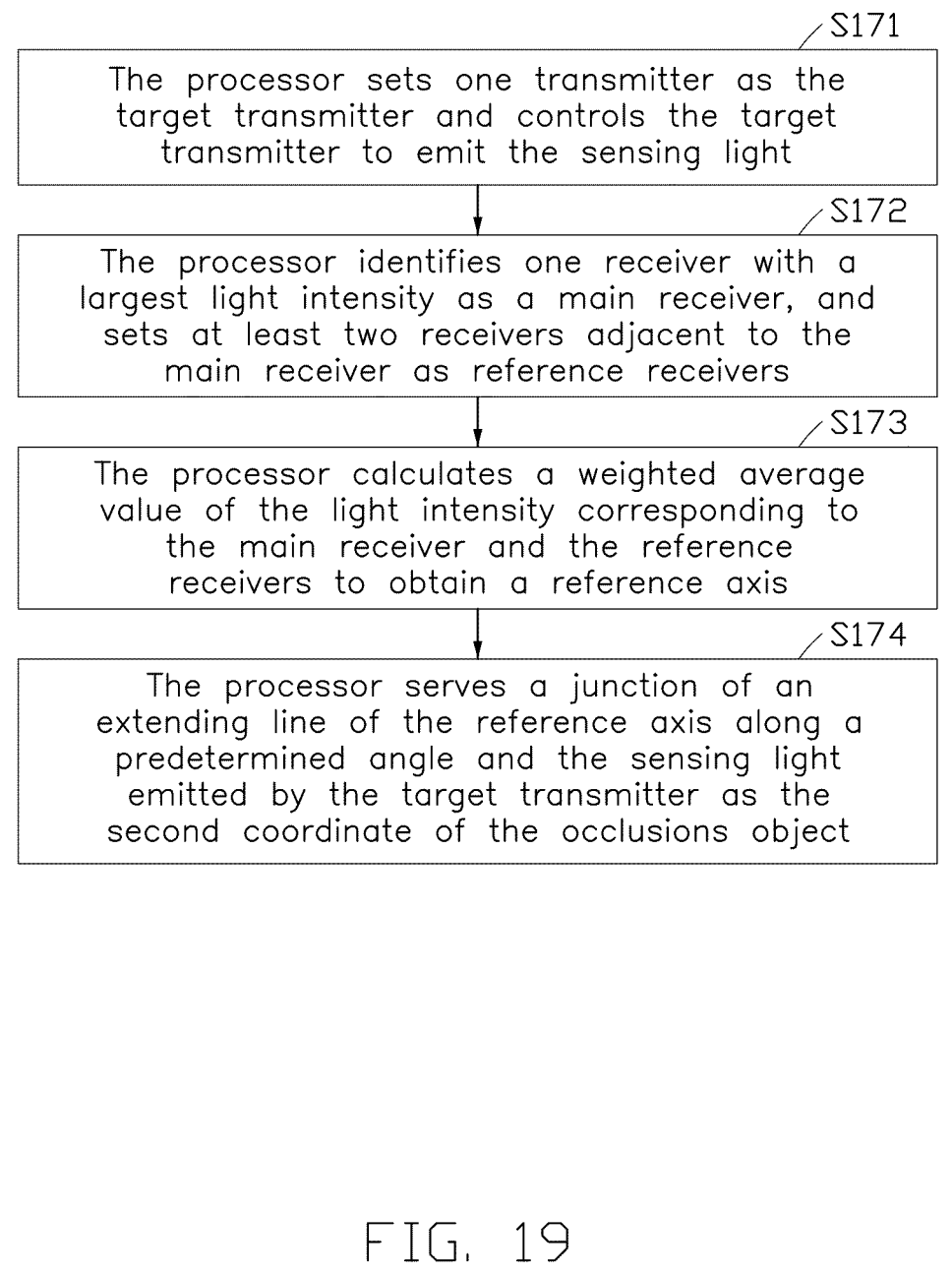

S171

The processor sets one transmitter as the target transmitter and controls the target transmitter to emit the sensing light

S172

The processor identifies one receiver with a largest light intensity as a main receiver, and sets at least two receivers adjacent to the main receiver as reference receivers

S173

The processor calculates a weighted average value of the light intensity corresponding to the main receiver and the reference receivers to obtain a reference axis

S174

The processor serves a junction of an extending line of the reference axis along a predetermined angle and the sensing light emitted by the target transmitter as the second coordinate of the occlusions object

FIG. 19

LOCATION SENSING METHOD, LOCATION SENSING DEVICE, AND INPUT TERMINAL APPARATUS

TECHNICAL FIELD

The present application generally relates to non-contact input device based on aerial imaging technology, and particular to a non-contact location sensing method, a location sensing device based on aerial imaging, and an input terminal apparatus thereof.

BACKGROUND

In an input terminal apparatus field, on current market there are multiple functions, types, and appearance styles of input terminal apparatuses, nothing else but fingerprints, traditional keys, and facial recognition. For the input terminal apparatus with the traditional mechanical keys, there is a risk of bacterial infection while using. For the type of the input terminal apparatus with fingerprint identification, a risk of leaking fingerprints on the pressed keys exists, further a safety hazards in personal information theft and leakage exists.

In view of above, the input terminal apparatus based on aerial imaging uses a location sensing apparats to sense a touching and clicking position. In related art, traditional location sensing device merely senses in two-dimensional, and fails to sense in three-dimensional. The function in human-computer interaction is weak.

SUMMARY OF THE DISCLOSURE

In view of above, the present application provides a location sensing method, a location sensing device, and an input terminal apparatus, aiming to solve the recited problem of failing to achieving a three-dimensional sense and a weak human-computer interaction.

The present application provides a location sensing method, used in an input terminal apparatus; the input terminal apparatus includes a location sensing device and a processor; the location sensing device forms an input sensing region upon the input terminal apparatus; the location sensing device includes a plurality of transmitters and a plurality of receivers; along a first direction the transmitters and the receivers are placed alternately by a predefined interval; the processor is electrically connected with the location sensing device, the location sensing method includes:

During an initial period, the processor sets a light intensity of the reflected light received by the receiver as an environment threshold;

During a sensing period, the processor controls the transmitters to emit sensing light along a second direction perpendicular to the first direction in turn, and converts the reflected light received by the receivers into an optical path image;

The processor denoises the optical path image;

The processor extracts an outline of the occlusion object and calculates at least one parameter of the outline when there is an occlusion object in the optical path image;

The processor removes noise points of the outline according to at least one parameter;

The processor obtains position coordinates of the occlusion object in the input sensing region by calculating the outline and the at least one parameter; the position coordinates are a first coordinate along the first direction and a second coordinate along the second direction;

The processor optimizes the first coordinate using a first optimizing manner; in the first optimizing manner, the first coordinate is optimized by analyzing the light intensity received by the corresponding receiver while at least two transmitters serve as a transmitter source respectively; and The processor optimizes the second coordinate using a second optimizing manner; in the second optimizing manner, the second coordinate is optimized by analyzing the light intensity received by two adjacent receivers while one of the transmitters serves as the transmitter source.

The present application also provide an input terminal apparatus, the input terminal apparatus includes a location sensing device and a processor; the location sensing device forms an input sensing region upon the input terminal apparatus; the location sensing device includes a plurality of transmitters and a plurality of receivers; along a first direction the transmitters and the receivers are placed alternately by a predefined interval; the processor is electrically connected with the location sensing device; during an initial period, the processor sets a light intensity of the reflected light received by the receiver as an environment threshold; during a sensing period, the processor controls the transmitters to emit sensing light along a second direction perpendicular to the first direction in turn, and convert the reflected light receive by the receivers into an optical path image; the processor denoises the optical path image; the processor extracts an outline of the occlusion object and calculates at least one parameter of the outline when there is an occlusion object in the optical path image; the processor removes noise points of the outline according to at least one parameter; the processor obtains position coordinates of the occlusion object in the input sensing region by calculating the outline and the at least one parameter; the position coordinates are a first coordinate along the first direction and a second coordinate along the second direction; the processor optimizes the first coordinate using a first optimizing manner; in the first optimizing manner, the first coordinate is optimized by analyzing the light intensity received by the corresponding receiver while at least two transmitters serve as a transmitter source respectively; the processor optimizes the second coordinate using a second optimizing manner; in the second optimizing manner, the second coordinate is optimized by analyzing the light intensity received by two adjacent receivers while one of the transmitters serves as the transmitter source.

The present application provides a location sensing device, used in an input terminal apparatus with an aerial display region; the location sensing device is disposed in the input terminal apparatus, the sensing light emitted by the location sensing device forms an input sensing region upon the aerial display region; the location sensing device includes at least one first sensing structure and a second sensing structure parallel with each other; the at least one first sensing structure and the second sensing structure are electrically connected with a main board in the input terminal apparatus; the at least one first sensing structure is upon the second sensing structure; the first sensing structure and the second sensing structure generate sensing signals when a sensed input operation exists in the input sensing region; the main board receives and determines an advancing depth along a direction perpendicular to the input sensing region according to the sensing signals of each of the first sensing structure and the second sensing structure, and identifies a touch position in the input sensing region according to the sensing signals of the second sensing structure, for achieving a three-dimensional sensing of the touch operation.

The present application also provides an input terminal apparatus, the input terminal apparatus includes an upper shell, a lower shell fixed with the upper shell, an optical component, a main board, a location sensing device, and a display device; the optical component and the location sensing device are received in the upper shell, the main board and the display device are received in the lower shell; the optical component refracts the light emitted by the display device to be upon the input terminal apparatus to form an aerial display region; the location sensing device senses a position and an advancing depth of a touch input operation in the input sensing region; the location sensing device includes at least one first sensing structure and a second sensing structure parallel with each other; the at least one first sensing structure and the second sensing structure are electrically connected with a main board in the input terminal apparatus; the at least one first sensing structure is upon the second sensing structure; the first sensing structure and the second sensing structure generate sensing signals when a sensed input operation exists in the input sensing region; the main board receives and determines the advancing depth along a direction perpendicular to the input sensing region according to the sensing signals of each of the first sensing structure and the second sensing structure, and identifies a touch position in the input sensing region according to the sensing signals of the second sensing structure, for achieving a three-dimensional sensing of the touch operation.

The above location sensing method, the location sensing device, and the input terminal apparatus, optimize the position coordinates of the occlusion object in the first direction and the second direction by adjusting a cooperation relationship between the transmitters and the receivers, for improving a resolution ratio and a sensing height of the input terminal apparatus, therefore an accuracy of the position coordinates of the occlusion object is improved. Meanwhile, a detection of the position and the advancing depth of the touch input operation is achieved by setting the first sensing structure and the second sensing structure, for achieving a three-dimensional sensing of the touch operation. The using states are identified according to the sensing signals of the first sensing structure and the second sensing structure, the multiple states, such as the pre-touch state, the input state, and mis-touch prompt state, are identified, thus a user experience is optimized while the human-computer interaction process of the input terminal apparatus.

BRIEF DESCRIPTION OF THE DRAWINGS

Implementations of the present disclosure will now be described, by way of example only, with reference to the attached figures.

FIG. 17 is a diagram illustrating a first embodiment of a position of the occlusion object and light intensity of a same receiver when using different transmitters as a light source.

FIG. 19 is a detail flowchart of the block S17 of FIG. 14.

Figure 1:
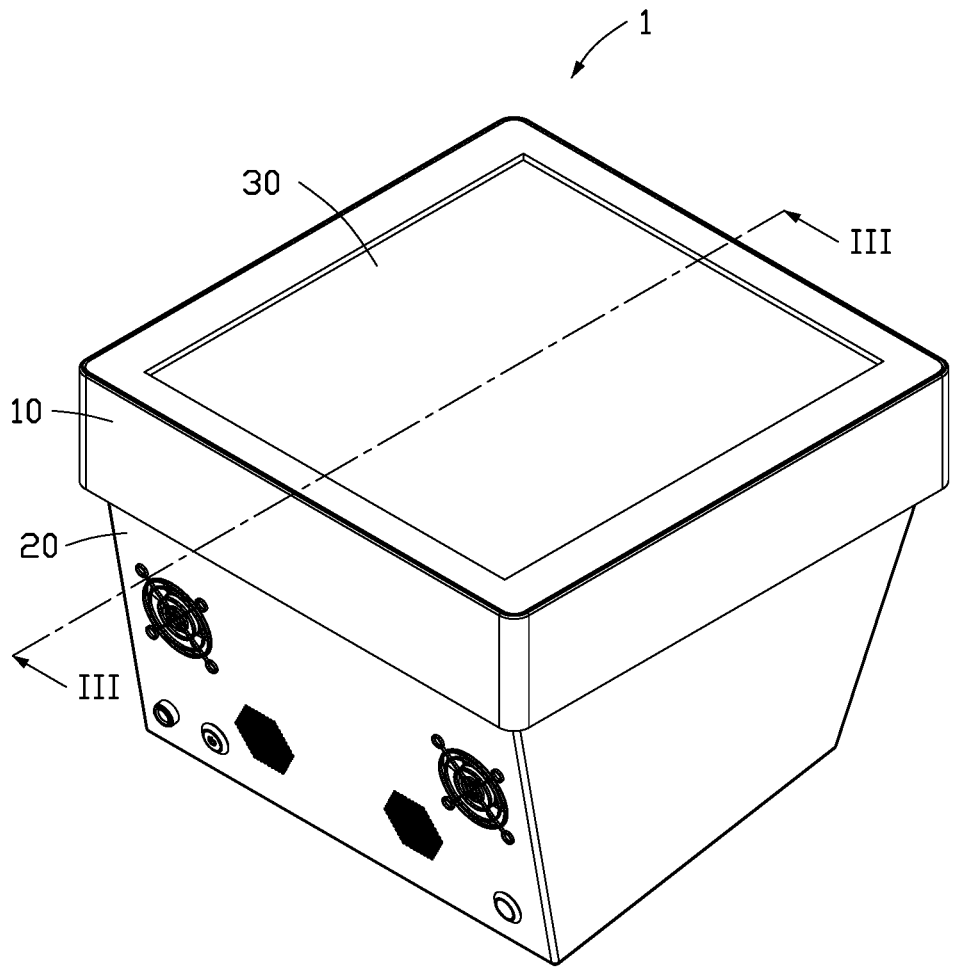
FIG. 1 is a diagram illustrating an embodiment of an input terminal apparatus according to the present application.

| NUMERIC OF MAIN COMPONETS | |
|---|---|
| Input terminal apparatus | 1 |
| Upper shell | 10 |
| Lower shell | 20 |
| Optical component | 30 |
| Location sensing device | 40 |
| Display device | 50 |
| Casing | 21 |
| Trapezoidal plate | 212 |
| Rectangular plate | 214 |
| Bottom plate | 23 |
| Side plate | 24 |
| Main board | 25 |
| Optical structure | 31 |
| Cover | 32 |
| Frame | 34 |
| Sensing support | 41 |
| Connection portion | 412 |
| Receiving portion | 413 |
| Sensing structure | 43 |
| First sensing structure | 43a, 43c |
| Second sensing structure | 43b |
| Emission surface | E |
| Base | 430 |
| Sensor | 431 |
| Lens portion | 432 |
| Receiving unit | 4311 |
| Transmitter unit | 4312 |
| First lens | 4321 |
| Cylindrical lens | 4324 |
| Display support | 51 |
| Limitation portion | 512 |
| Loading portion | 513 |
| Display structure | 52 |
| Aerial display region | 300 |
| Input sensing region | 200 |
| First sub-region | 200a |

-continued

| NUMERIC OF MAIN COMPONETS | |
| --- | --- |
| Second sub-region | 200b |
| Third sub-region | 200c |
| Storage | 101 |
| Processor | 102 |
| Optical component | 106 |
| Display device | 108 |
| Predefined distance | D |
| Shifted distance | U |
| Occlusion object | S |
| Reference axis | R |
| Predefined angle | θ |
| Blocks | S10-S17 |

The following specific embodiments will further illustrate the present application in conjunction with the above drawings.

DETAILED DESCRIPTION

The technical solutions in the embodiments of the present application will be clearly and completely described below which combine with reference to the accompanying drawings in the embodiments of the present application. Apparently, the described embodiments are some of the embodiments of the present application rather than all of the embodiments. Based on the embodiments of the present application, it is understandable to a person skilled in the art, any other embodiments obtained by persons skilled in the art without creative effort shall all fall into the scope of the present disclosure. It will be understood that the specific embodiments described herein are merely some embodiments and not all.

It should be noted that when an element is considered to be "connected" to another element, it may be directly connected to another element or there may be an element that is centrally located at the same time. When an element is considered to be "disposed" on another element, it may be directly arranged on the other element or there may be a centrally arranged element at the same time.

Unless otherwise defined, all technical and scientific terms used herein have the same meaning as commonly understood by those skilled in the technical field of the present application. The terminology used in the specification of the present application herein is for the purpose of describing specific embodiments only, and is not intended to limit the present application. The term "and/or" as used herein includes any and all combinations of one or more related listed items.

Referring to FIG. 1, FIG. 1 shows a diagram of an embodiment of an input terminal apparatus 1 of the present application. The input terminal apparatus 1 is configured to form a holographic image (not shown) in the air, and sense operations of users on the holographic image to generate touch input signals. In one embodiment of the present application, the input terminal apparatus 1 may be used in self-service deposit and withdrawal machines, and also may be used in household appliances vehicles and other human-computer interaction devices.

Figure 2:
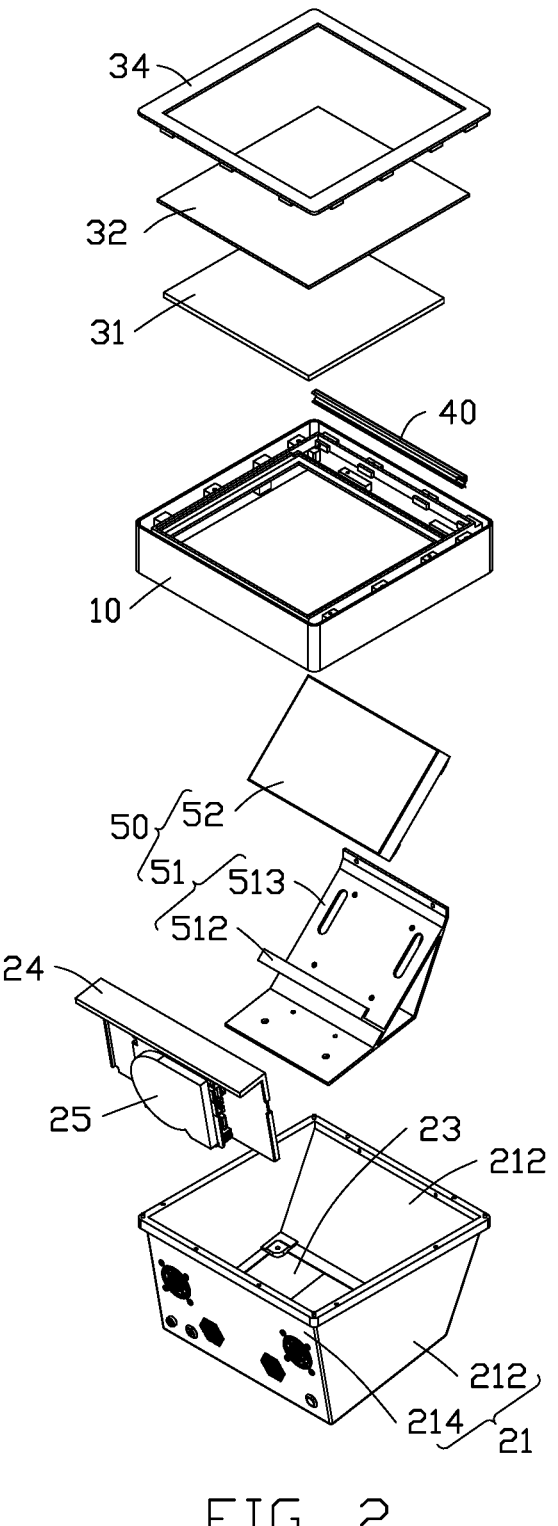
FIG. 2 is a partially exploded view of the input terminal apparatus of FIG. 1.
Figure 3:
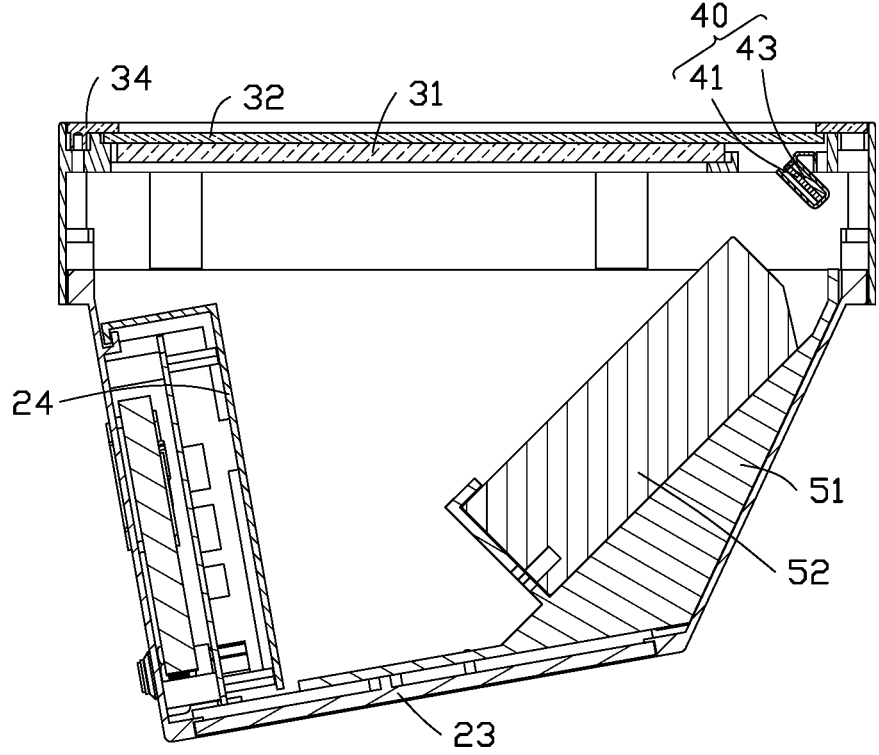
FIG. 3 is a cross-sectional view of the input terminal apparatus of FIG. 1 taken along III-III.

Referring to FIGS. 1-3 at the same time, the input terminal apparatus 1 includes an upper shell 10, a lower shell 20, an optical component 30, a location sensing device 40, and a display device 50. The upper shell 10 and the lower shell 20 are removably mounted together to form a receiving space for receiving the optical component 30, the location sensing device 40, and the display device 50. In one embodiment, the upper shell 10 and the lower shell 20 are mounted by screws.

The lower shell 20 includes a casing 21, a bottom plate 23, a side plate 24, and a main board 25. The casing 21 is substantially quadrangle shaped, and is formed by three trapezoidal plates 212 and a rectangular plate 214. The rectangular plate 214 is disposed between the two opposite trapezoidal plates 212 of the trapezoidal plates 212. The rectangular plate 214 further sets with a heat dissipation structure (not labeled), at least one interface (not labeled), and multiple keys (not labeled). The bottom plate 23 is configured to load the side plate 24 and the display device 50. The bottom plate 23 is substantially rectangular shaped. The side plate 24 is perpendicular disposed on an edge of the bottom plate 23, and is adjacent to the rectangular plate 214. A cross-sectional of the side plate 24 is substantially in a L shaped, and an opening direction of the side plate 24 is opposite to the rectangular plate 214. The main board 25 is fixed on the side plate 24 by screws (not shown). The main board 25 is electrically connected with the location sensing device 40 and the display device 50 by wires (not shown), and is configured to executed data communication with the location sensing device 40 and the display device 50, for receiving input signals identified by the location sensing device 40 and controlling the display device 50 to display.

Figure 4:
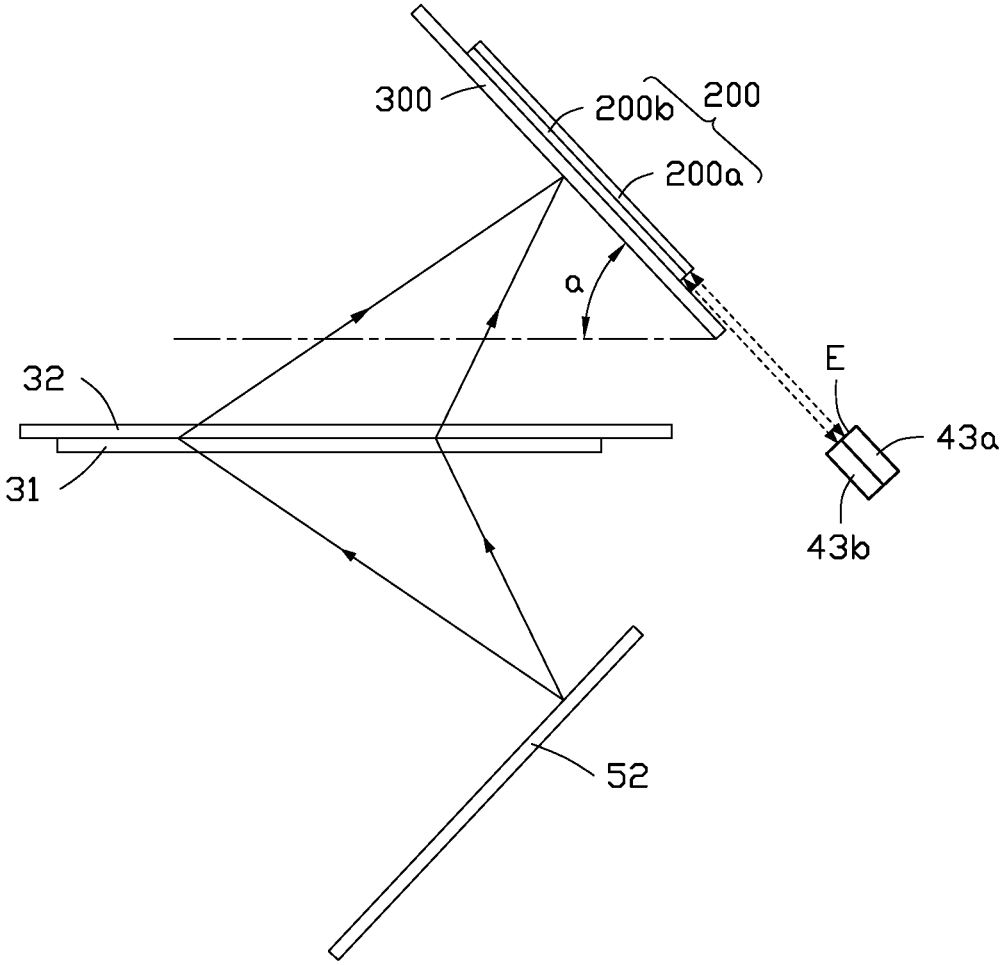
FIG. 4 is an optical path diagram illustrating the input terminal apparatus of FIG. 1.

Referring to FIG. 4, it shows an optical path of the input terminal apparatus 1. The input terminal apparatus 1 has an input sensing region 200 and an aerial display region 300. The light emitted by the display device 50 disposed on a side of the optical component 30 forms the holographic image in the aerial display region 300 in another side of the optical component 30 by a reflection effect of the optical component 30, sensing light emitted by the location sensing device 40 forms the input sensing region 200 upon the aerial display region 300. The input sensing region 200 and the aerial display region 300 are parallel with each other. When viewing from a direction perpendicular to the optical component 30, the input sensing region 200 is upon the aerial display region 300, and an area of the aerial display region 300 is larger than an area of the input sensing region 200. The aerial display region 300 is configured to display the image displayed in the display device 50.

Referring to FIGS. 2 and 3 again, the optical component 30 is received in the upper shell 10, and is configured to reflect the light emitted by the display device 50 and project in the air upon the upper shell 10 to form the aerial display region 300. The optical component 30 includes at least one optical structure 31, at least one cover 32, and at least one frame 34, which are disposed on that order. The optical structure 31 is substantially rectangular shaped. In one embodiment of the present application, the optical structure 31 includes at least one layer of effective negative refractive index plate lens. For example, the optical structure 31 includes two transparent bases, a first optical waveguide array, and a second optical waveguide array. The first optical waveguide array and the second optical waveguide array are disposed between the two transparent bases. The first optical waveguide array and the second optical waveguide array are disposed on a same surface and orthogonally disposed. The transparent base includes two optical surfaces. A transmissivity of the transparent base for the light with the wavelengths range from 390 nm to 760 nm may be 90%-100%. The transparent base may be made by at least one of glass, plastic, polymer, or acrylic resin. The transparent base is configured to protect the first optical waveguide array and the second optical waveguide array and filter other lights. It should be noted that, if a strength of the pasted first optical waveguide array and the second optical waveguide array is enough or a thickness of a mounting position is limited, there may be one transparent base or the transparent bases may be not configured. The first optical waveguide array and the second optical waveguide array includes a plurality of reflection units with a cross-sectional of which is substantially rectangular shaped. Lengths of the reflection units are different due to a limitation of a size of the optical wavelength array. An extending direction of the reflection unit in the first optical waveguide array is perpendicular to an extending direction of the reflection unit in the second optical waveguide array. Therefore, the first optical waveguide array and the second optical waveguide array are orthogonally disposed, which cause the light beams along the orthogonal direction to be focused at one point, and ensure an object and an image (located at a light source side and an imaging side) to be symmetrically disposed relative to the plate lens. An effective negative refractive index occurs, and the aerial image is achieved. One side or two sides of the reflection unit is covered by a reflecting film. In detail, along a disposing direction of the optical waveguide array, both sides of each reflection unit are coated with the reflecting film. The material of the reflecting film may be metal material for achieving total internal reflection such as aluminum or silver or non-metal chemical compound material. An effect of the reflecting film prevents the light without being total internal reflected being entered into adjacent the first optical waveguide array or the second optical waveguide array to form parasitic light, which influences the image performance. Otherwise, each reflection unit coats dielectric film on the reflecting film (not shown). An effect of the dielectric film is to improve a light reflectivity.

The imaging principle of the optical structure 31 will described as below.

In micro-scale, using two layers of orthogonal optical waveguide arrays, light signal is processed by orthogonal decomposition. The light signal emitted by the display device 50 as original signal is projected on the first optical waveguide array. A coordination system is set up based on the projected point as an origin and an X-axis being perpendicular to the first optical waveguide array. In the coordination system, the original signal is decomposed into a signal located on the X-axis and a signal located on a Y-axis, which are being orthogonal. When the signal on the X-axis passes through the first optical waveguide array, the signal on the X-axis is being total reflected on the reflection film with a reflex angle being same as an incident angle. At the same time, the signal on the Y-axis remains parallel to the first optical waveguide array. After passing through the first optical waveguide array, the signal on the Y-axis is being total reflected on the reflection film of the second optical waveguide array with a reflex angle being same as an incident angle. The reflected signal on the Y-axis and the reflected signal on the X-axis form a reflected light signal, which is mirror symmetry with the original signal. Thus, light from any directions passes through the optical structure 31 achieves mirror symmetrical. Divergent light emitted by any light source passes through the optical structure 31 forms a floating real image at a symmetrical position. An imaging distance of the floating real image is equal to a distance between the optical structure 31 and the display device 50, which is an equidistant image. The floating real image is directly displayed in the air without a carrier, the real image is directly imaged in the air. Thus, the image in the air saw by the user is the image emitted by the display device 50.

The cover 32 is substantially rectangular shaped, both of a length and a width of the cover 32 are larger than a length and a width of the optical structure 31 respectively. The cover 32 is pasted together with the optical structure 31, and is pasted on a lower surface of the frame 34 being opposite to the optical structure 31. The cover 32 is configured to prevent dust from being entered into the upper shell 10. In one embodiment of the present application, the cover 32 is a toughened glass. The frame 34 is substantially rectangular frame shaped. Inner edges of the frame 34 are partially overlapped with outer edges of the cover 32. The overlapped portion are pasted together, and resist with the upper shell 10. The frame 34 is removably mounted on the upper shell 10. In one embodiment of the present application, the frame 34 is made of common glass. In other embodiments, the frame 34 may be made of other material.

The location sensing device 40 is configured to emit the sensing light and form the input sensing region 200. When there is a target object in the input sensing region 200, the location sensing device 40 receives the reflected light of the target object and generates sensing signals for identifying a using state of the user. In one embodiment of the present application, the location sensing device 40 uses infrared light as the sensing light. The target object may be a finger or other biological structure. The location sensing device 40 is adjacent to the optical component 30, and is upper the display device 50.

Figure 5:
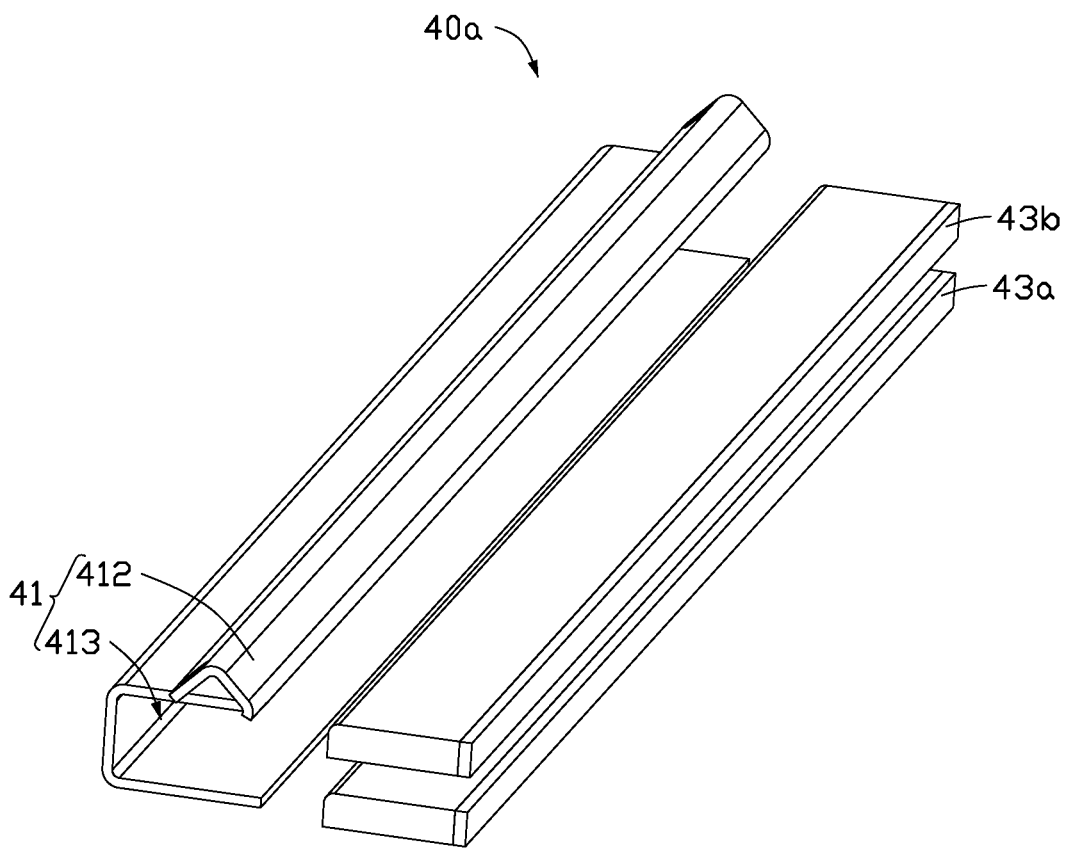
FIG. 5 is a partially exploded view of a first embodiment of the location sensing device of FIG. 2 viewed from another angle.

The location sensing device 40 includes a sensing support 41 and at least one sensing structure 43 (as shown in FIG. 3). The sensing support 41 is disposed between the optical structure 31 and a sidewall of the upper shell 10. The sensing support 41 is configured to receive the sensing structure 43. Referring to FIG. 5, the sensing support 41 includes a connection portion 412 and a receiving portion 413. The connection portion 412 is configured to locate the position of the receiving portion 413 in the upper shell 10, for making the sensing structure 43 to be angled with the optical structure 31. The connection portion 412 is substantially hollow structure. In one embodiment, a cross-sectional of the connection portion 412 is substantially right triangle shaped. The receiving portion 413 is configured to receive the sensing structure 43. A cross-section of the receiving portion 413 is substantially U shaped. An opening of the receiving portion 413 faces to the optical structure 31. The receiving portion 413 is extended from a sloping edge of the connection portion 412.

The sensing structure 43 is configured to emit the sensing light. The sensing structure 43 has an emission surface E (as shown in FIG. 4). The sensing structure 43 emits the sensing light through the emission surface E and receives the light reflected by the target object passing through the input sensing region 200. The sensing structure 43 includes at least one first sensing structure 43a and a second sensing structure 43b. The first sensing structure 43a is configured to identify a touch operation of the user in the input sensing region 200. The second sensing structure 43b is configured to identify a touch position of the user in the input sensing region 200. The main board 25 determines an advancing depth along a direction perpendicular to the input sensing region 200 based on the sensing signals generated by the first sensing structure 43a and the second sensing structure 43b, and identifies the touch position in the input sensing region 200 based on the sensing signal from the second sensing structure 43b, for achieving a three-dimension touch sensing.

First Embodiment

Referring to FIGS. 4 and 5, FIG. 4 shows an optical path view of the input terminal apparatus 1, and FIG. 5 shows a partially exploded view of a first embodiment of the location sensing device 40a from another angle. In the first embodiment of the present application, the location sensing device 40a includes two sensing structures 43. The upon sensing structures 43 serves as the first sensing structure 43a. The first sensing structure 43a forms a first sub-region 200a upon the aerial display region 300. The below sensing structure 43 serves as the second sensing structure 43b. The second sensing structure 43b forms a second sub-region 200b between the first sub-region 200a and the aerial display region 300, and is adjacent to the aerial display region 300. The first sub-region 200a is away from the aerial display region 300. The first sensing structure 43a and the second sensing structure 43b are parallel with each other.

Figure 6:
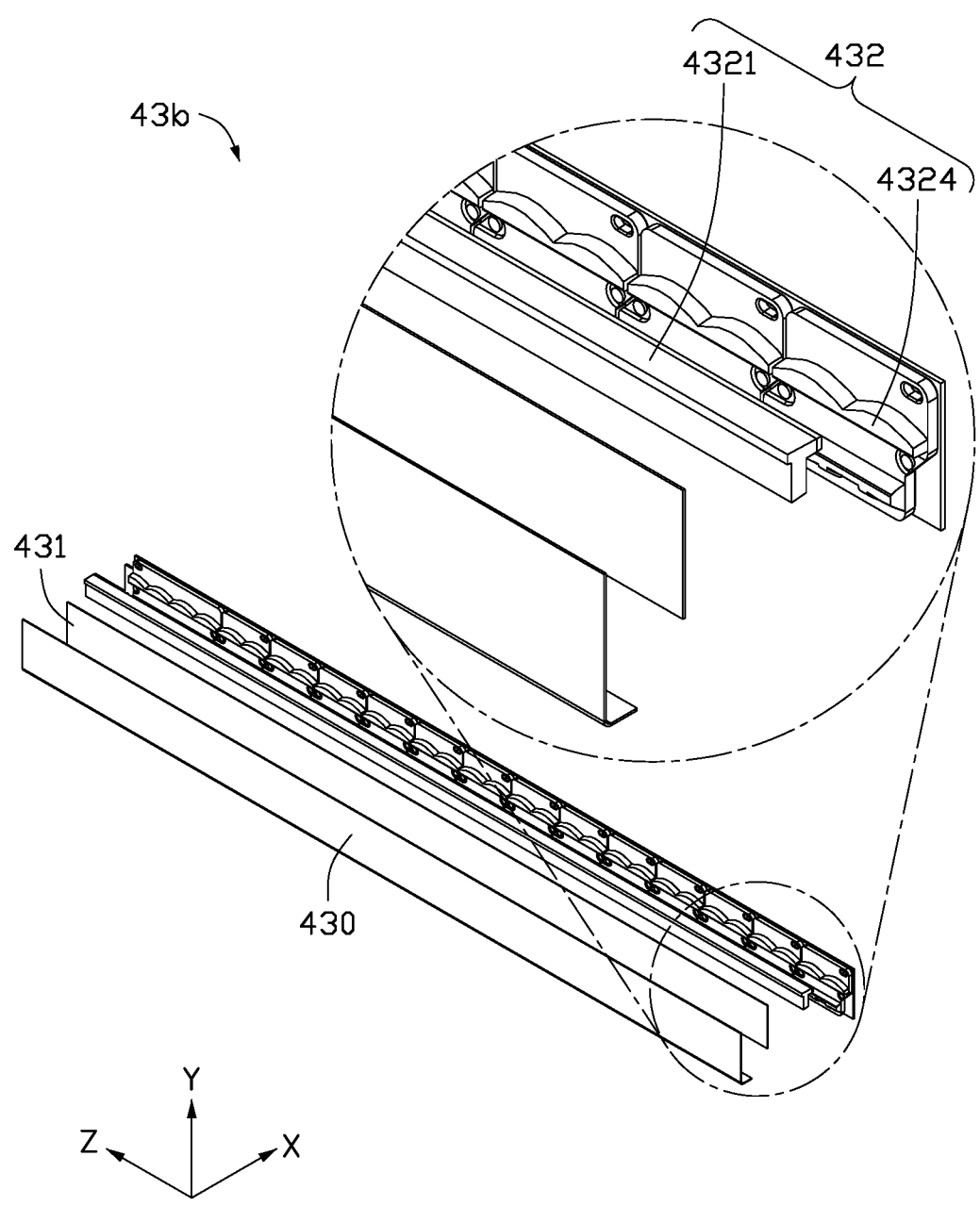
FIG. 6 is a partially exploded view of the sensing structure of FIG. 5.
Figure 7:
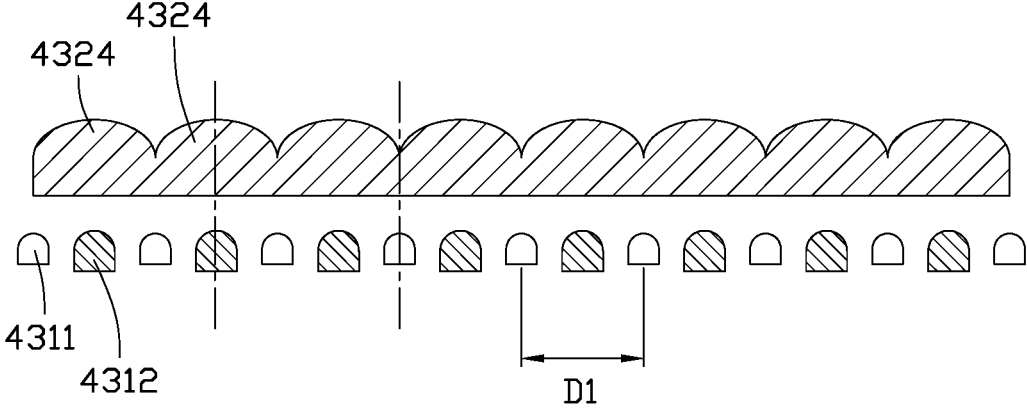
FIG. 7 is a diagram of the sensor and the cylindrical lens of FIG. 6.

Referring FIG. 6, it shows a partially exploded view of the second sensing structure 43b. The structures of the first sensing structure 43a and the second sensing structure 43b are the same. The second sensing structure 43b is described as below as an example. The second sensing structure 43b includes a base 430, a sensor 431, and a lens portion 432. The base 430 is substantially rectangular plate shaped. The base 430 is configured to load the sensor 431. A size of the sensor 431 is equal to a size of the base 430. Referring to FIG. 7, the sensor 431 includes a plurality of receivers 4311 and a plurality of transmitters 4312. The receivers 4311 and the transmitters 4312 are alternately disposed on the base 430 by a first interval. The transmitter 4312 is configured to emit the sensing light. The receiver 4311 is configured to receive the reflected light and generate the sensing signal. The lens portion 432 converts a direction of the sensing light along a direction parallel with the emission surface E into the direction perpendicular to the emission surface E and is emitted from the emission surface E, and collimates the sensing light. The lens portion 432 includes a first lens 4321 and a plurality of cylindrical lenses 4324. A cross-sectional of the first lens 4321 is substantially T shaped. The first lens 4321 is opposite to the sensor 431. The first lens 4321 coverts a direction of the sensing light emitted along a first direction X into a second direction Y perpendicular to the first direction X and is emitted to the cylindrical lenses 4324. The cylindrical lenses 4324 are coplanar, and are disposed upon the first lens 4321. In the second direction Y, the cylindrical lenses 4324 overlap with the sensor 431. A cross-sectional of the cylindrical lens 324 is substantially in cap shape. The sensing light entered into the cylindrical lens 4324 emits from the emission surface E to form the first sub-region 200a upon the aerial display region 300. As shown in FIG. 7, in the second direction Y, an axis direction of the cylindrical lens 4324 is overlapped with an axis direction of the transmitter 4312. An axis direction of the receiver 4311 is evenly spaced to a central axis of two adjacent cylindrical lenses 4324.

While the location sensing device 40 executes a touch sense, the first sensing structure 43a and the second sensing structure 43b emit the sensing light for forming the first sub-region 200a and the second sub-region 200b upon the location sensing device 40. While touching or clicking the aerial display region 300, the target object passes through the first sub-region 200a and the second sub-region 200b, the emitted sensing light are reflected, are received by the first sensing structure 43a and the second sensing structure 43b, and are converted into the sensing signals. The main board 25 determines a using state of the user according to the sensing signals generated by the first sensing structure 43a and the second sensing structure 43b. When the main board 25 merely receives the sensing signals outputted by the first sensing structure 43a, the main board 25 determines that the using state is a pre-touching state. When the using state is the pre-touching state, it represents that the user does not touch the aerial display region 300. When the main board 25 receives the sensing signals outputted by the first sensing structure 43a and the second sensing structure 43b at the same time, the main board 25 determines that the using state is a touch input state. When the using state is the touch input state, it represents that the user has already touch the aerial display region 300. Further, the main board 25 may generate different control signals to the display device 50 according to the different using states for controlling the aerial display region 300 to change synchronized. For example, when the using state is the touch input state, the main board 25 generates the control signals for making the display image corresponding to the second sensing structure 43b to be jiggled, highlighted, or flickered, etc. but not being limited. In other embodiments, the control signals may also control audio output apparatus to output prompt tone or control a vibration apparatus to generate vibration in different frequencies.

Figure 8:
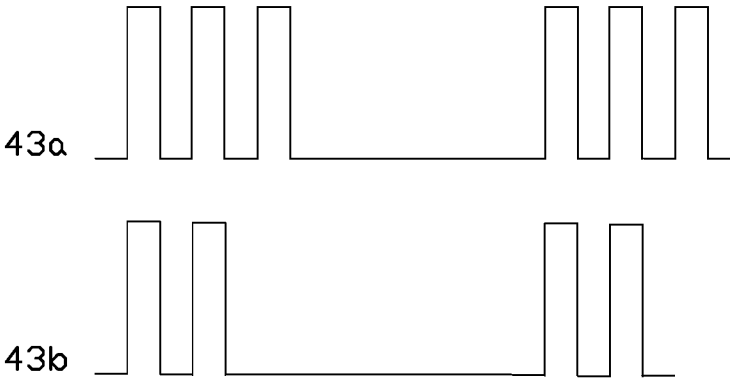
FIG. 8 is a waveform diagram of driving signals of the sensor of the FIG. 5.

Referring to FIG. 8, it is a waveform diagram of the driving signals of the transmitter 4312 of the first sensing structure 43a and the transmitter 4312 of the second sensing structure 43b. The transmitter 4312 of the first sensing structure 43a driven by the driving signal in a first pulse frequency emits light, and the transmitter 4312 of the second sensing structure 43b driven by the driving signal in a second pulse frequency emits light. The first pulse frequency is larger than the second pulse frequency. The main board 25 further determines that the sensing signals of the first sensing structure 43a and the second sensing structure 43b according to the frequency of the received sensing signals.

Referring to FIGS. 2 and 3 again, the display device 50 is configured to display input interface. The display device 50 is received in the lower shell 20, and is angled with the optical component 30. The display device 50 is supported by the bottom plate 23. The display device 50 includes a display support 51 and a display structure 52. The display frame 51 includes a limitation portion 512 and a loading portion 513. A cross-sectional of the limitation portion 512 is substantially L shaped, and an opening of the limitation portion 512 faces the display structure 52. The limitation portion 512 is configured to limit a position of the display structure 52 on the loading portion 513, and prevents the display structure 52 from being slide towards to a direction close to the bottom plate 23. The loading portion 513 is fixed on the bottom plate 23. The loading portion 513 is configured to place the display structure 52 in the lower shell 20 to be angled with the bottom plate 23 at a predefined angle, and a display surface of the display structure 52 is opposite to the optical structure 31. In one embodiment of the present application, the predefined angle is an acute angle. The loading portion 513 is a hollow structure, and a cross-sectional of the loading portion 513 is substantially obtuse triangle shaped. A display surface of the display structure 52 is opposite to the optical structure 31. The display structure 52 is clamped on the display support 51. In one embodiment of the present application, the display structure 52 may be different types display structures, such as a liquid crystal display screen, an orogenic light emitting diode (OLED) display screen, an electrophoretic display screen, and so on, not being limited. The display structure 52 is configured to display the input interface. In one embodiment of the present application, the input interface may be a password input interface, also may be a virtual keyboard interface, and also may be an operation demonstration video image, not being limited.

Second Embodiment

Figure 9:
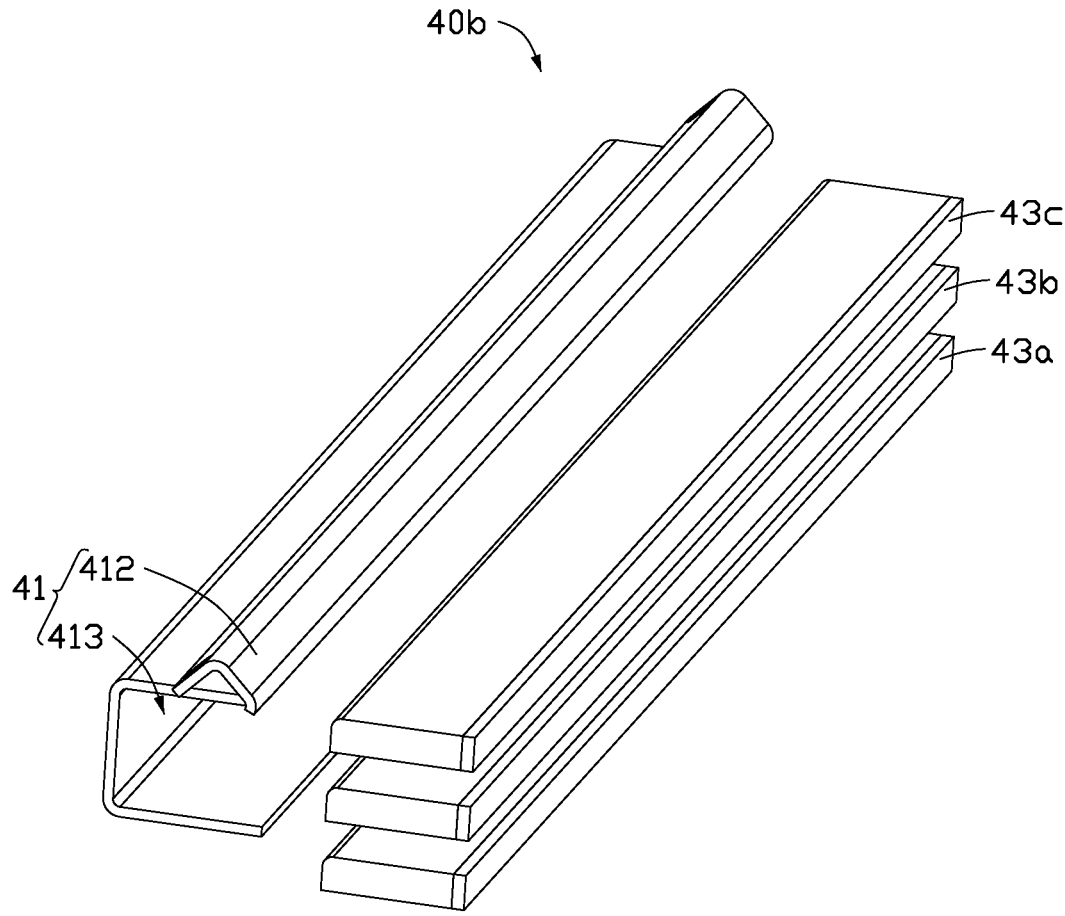
FIG. 9 is a partially exploded view of a second embodiment of the location sensing device of FIG. 2 viewed from another angle.

Referring to FIG. 9, it is a diagram of a second embodiment of the location sensing device 40b the present application. The structure of the location sensing device 40b is almost the same as the structure of the location sensing device 40a, the components with the same function will not describe. In that means, the description of the location sensing device 40a in the first embodiment almost suitable to the location sensing device 40b, and the difference is the location sensing device 40b includes three sensing structures 43. The sensing structure 43 in the middle of the sensing structures 43 serves as the second sensing structure 43b, and the other two sensing structures 43 serve as the first sensing structure 43a/43c. The first sensing structure 43c is configured to improve the sense of the advancing depth of the location sensing device 40b along a direction perpendicular to the input sensing region 200.

Figure 10:
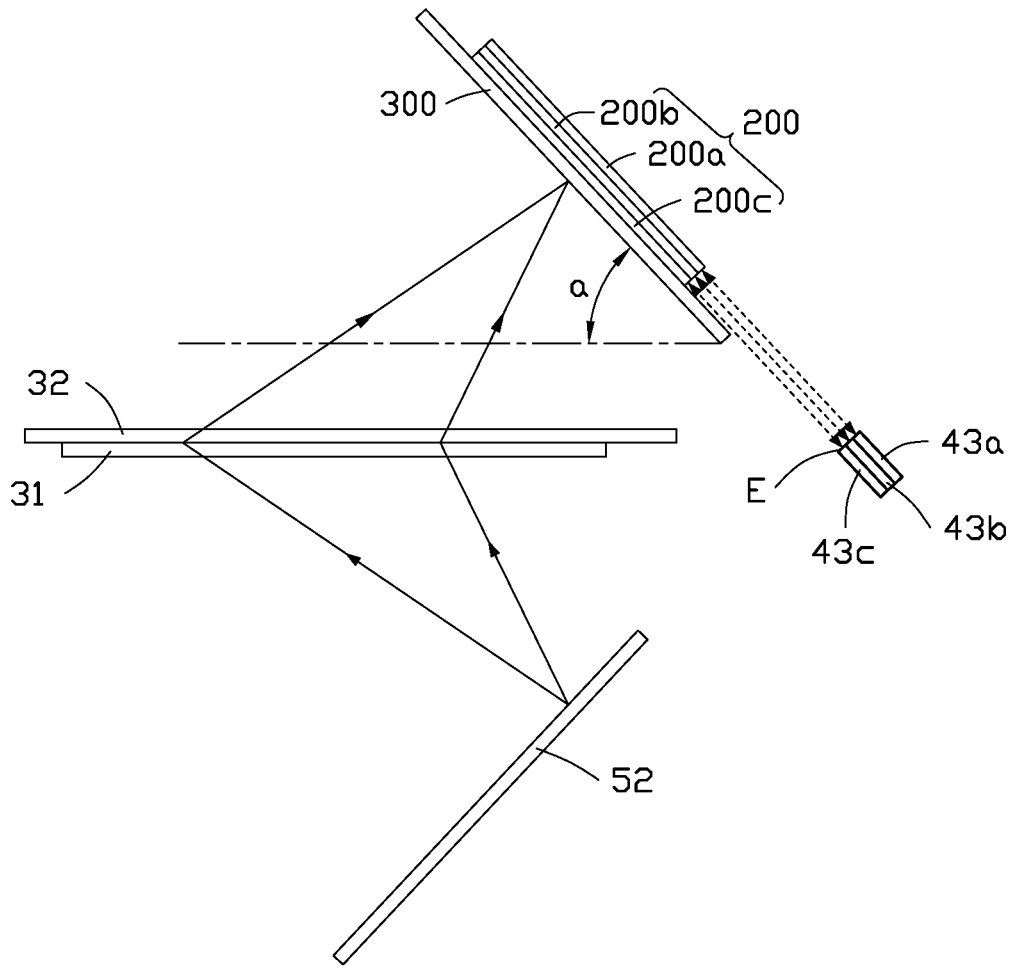
FIG. 10 is an optical path diagram of the input terminal apparatus of FIG. 9.

While the location sensing device 40b executes a touch sense, the first sensing structures 43a/43c and the second sensing structure 43b emit the sensing light for forming the first sub-region 200a, the second sub-region 200b, and a third sub-region 200c (as shown in FIG. 10) upon the location sensing device 40b. The first sensing structures 43a/43c and the second sensing structure 43b receive the reflected light and convert into the sensing signals. The main board 25 determines the using state of the user according to the sensing signals generated by the first sensing structures 43a/43c and the second sensing structure 43b. When the main board 25 merely receives the sensing signals from the upon first sensing structure 43a, the main board 25 determines that the using state is a pre-touch state. When the using state is the pre-touch state, it represents that the user does not touch the aerial display region 300. When the main board 25 receives the sensing signals of the upon first sensing structure 43a and the sensing signals of the second sensing structure 43b, the main board 25 determines that the using state is a touch input state. When the using state is the touch input state, it represents that the user touches the aerial display region 300. When the main board 25 receives the sensing signals from the first sensing structures 43a/43c and the sensing signals from the second sensing structure 43b, the main board 25 determines that the using state is a false triggering prompt state. When the using state is the false triggering prompt state, it represents that the main board 25 generates the control signal for prompting the user a touch depth to be too deep, and a plurality of positions in the second sub-region 200b being false triggered are identified.

Third Embodiment

Referring to FIG. 5 again, the structure of the location sensing device 40 is almost the same as the structure of the location sensing device 40a, the components with the same function will not describe. In that means, the description of the location sensing device 40a in the first embodiment almost suitable to the location sensing device 40 of the third embodiment, and the difference is the first sensing structure 43a without the lens portion 432. That is, the first sensing structure 43a merely includes the base 430 and the sensor 431.

Because the first sensing structure 43a is merely configured to sense whether the touch operation is generated, and does not need to detect a detail touch position. Thus, the light emitted by the transmitters 4312 in the first sensing structure 43a does not need to be collimated. Therefore, the lens portion 432 in the first sensing structure 43a is removed.

Figure 11:
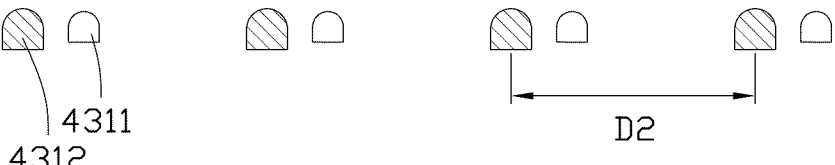
FIG. 11 a diagram of the sensor and the cylindrical lens of FIG. 9.

At the same time, when the detail position does not need to be detected, the number of the transmitters 4312 and the receivers 4311 and the interval between may be further adjusted for decreasing a cost. Referring to FIG. 11, in the third embodiment, the transmitters 4312 and the receivers 4311 may be alternately set in a second interval D2. The second interval D2 is larger than the first interval D1.

Fourth Embodiment

Referring to FIG. 10 again, it is a diagram of a fourth embodiment of the location sensing device 40. The structure of the location sensing device 40 is almost the same as the structure of the location sensing device 40b, the components with the same function will not describe. In that means, the description of the location sensing device 40a in the first embodiment almost suitable to the location sensing device 40b, and the difference is the first sensing structures 43a/43c without the lens portions 432. That is, the first sensing structures 43a/43c merely include the base 430 and the sensor 431. The first sensing structure 43c is configured to improve the sensing of the advancing depth along the direction perpendicular to the input sensing region 200.

Because the first sensing structures 43a/43c are merely configured to sense whether the touch operation is generated, and do not need to detect a detail touch position. Thus, the light emitted by the transmitters 4312 in the first sensing structures 43a/43c does not need to be collimated. Therefore, the lens portion 432 is removed. At the same time, when the detail position does not need to be detected, the number of the transmitters 4312 and the receivers 4311 and the interval between may be further adjusted for decreasing a cost. Referring to FIG. 11, in the third embodiment, the transmitters 4312 and the receivers 4311 may be alternately set in a second interval D2. The second interval D2 is larger than the first interval D1.

In other embodiments, the location sensing device 40 may adjust the number of the sensing structure 43 according to a requirement, such as using four sensing structures 43.

Using the above structure of the location sensing device 40, by setting the at least one first sensing structure 43a and the second sensing structure 43b, the advancing depth along the direction perpendicular to the input sensing region 200 is determined according to the sensing signals of the first sensing structure 43a and the second sensing structure 43b, and the position in the input sensing region 200 is determined according to the sensing signals of the second sensing structure 43b, for achieving the three-dimensional detection. Meanwhile, the using state may be identified by different combinations of the sensing signals of the first sensing structure 43a and the second sensing structure 43b, and include a plurality of states, such as a pre-touch state, a touch input state, and a false triggering prompt state, and so on. The display image in the aerial display region 300 is changed at the same time by the controlling of the different using states for prompting the user, the user experience is improved while the human-computer interaction process of the input terminal apparatus 1. At the same time, by using the lens portion 432, the sensing light is collimated.

Figure 12:
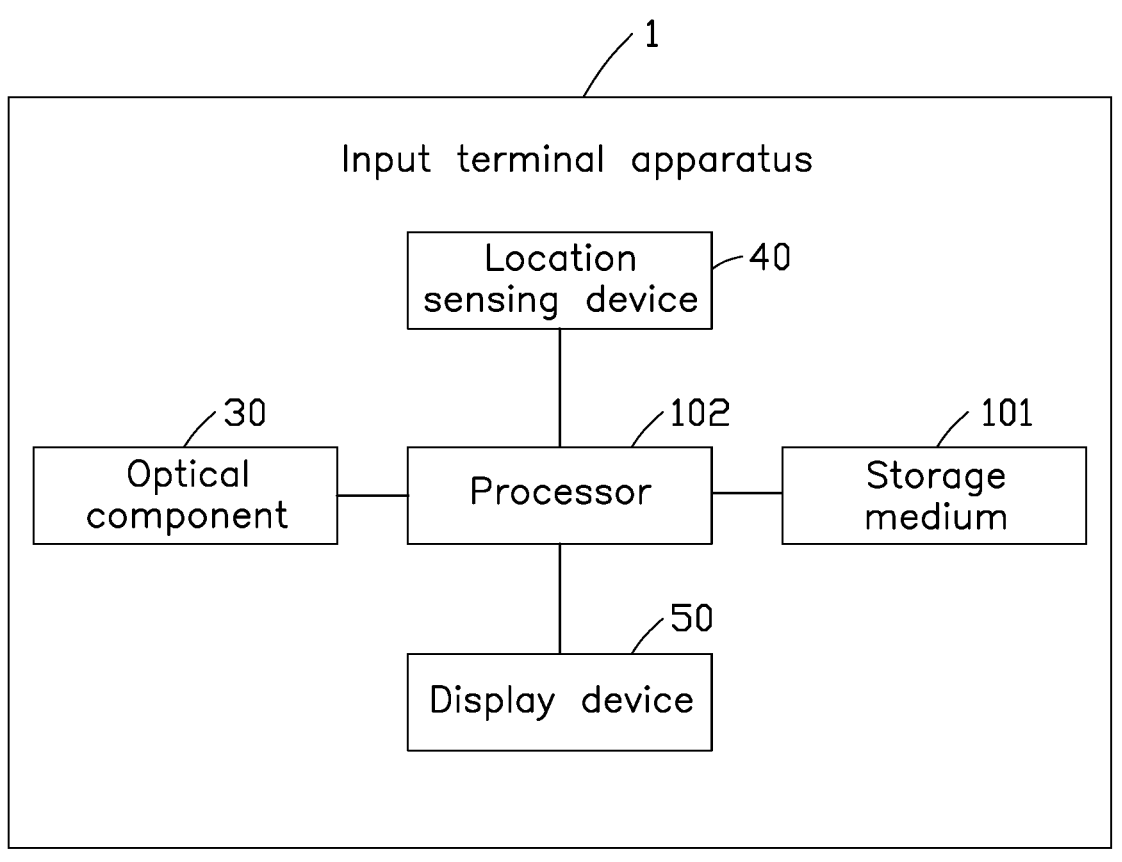
FIG. 12 is a block diagram illustrating an embodiment of the input terminal apparatus according to the present application.
Figure 13:
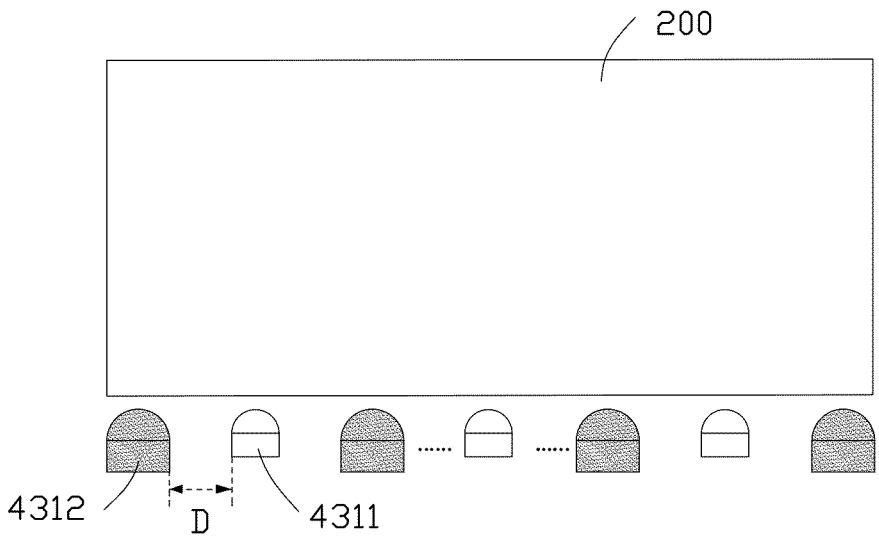
FIG. 13 is a block diagram of the location sensing device of FIG. 12.

Referring to FIGS. 12 and 13, FIG. 12 is a block diagram of the input terminal apparatus 1. FIG. 13 is a block diagram of the location sensing device 40. The input terminal apparatus 1 includes a storage medium 101, a processor 102, and the location sensing device 40.

The storage medium 101 is configured to store program codes. The storage medium 101 may be non-physical storage circuits in an embedded circuit, such as storage device of a memory, a trans-flash (TF) card, a smart media card, a secure digital card, a flash card, and so on. The storage medium 101 communicates with the processor 102 through a communication bus.

The processor 102 may include one or more microprocessor or digital processor. the processor 102, also known as a CPU (Central Processing Unit), is a very large scale integrated circuit which is the Core of operation and the Control Unit. The processor 102 may invoke the program codes stored in the storage medium 101 to execute related function. The processor 102 may execute the program codes stored in the storage medium 101 to implement a location sensing method.

Referring to FIG. 13, it is a block diagram of the location sensing device 40. The location sensing device 40 has the input sensing region 200. When there is a target object in the input sensing region 200, the location sensing device 40 identifies a position of the target object. The location sensing device 40 is configured to emit the sensing light, and convert the received reflected light into optical path image. The location sensing device 40 includes a plurality of receivers 4311 and a plurality of transmitters 4312. Each transmitter 4312 and one of the adjacent receivers 4311 form a sensing couple. In a first direction X, the transmitters 4312 and the receivers 4311 are alternately disposed by a predefined distance to form multiple sensing couples. The transmitter 4312 is configured to emit the sensing light. The receiver 4311 is configured to receive the reflected light and form the optical path image. In one embodiment of the present application, the predefined distance is in a range from 1 millimeter (mm) to 20 mm. Along a second direction Y being perpendicular to the first direction X, each receiver 4311 serves as a sensing path. The receiver 4311 receives the reflected light to form the optical path image. In one embodiment of the present application, the sensing light is infrared light, a wavelength of the sensing light may be 940 nanometer, or be 850 nanometer. In at least one embodiment of the present application, there is a filter disposed upon the transmitter 4312 for filtering stray light in a predetermined wavelength range. The predetermined wavelength range may be in a range from 770 nanometer to 920 nanometer and from 960 nanometer to 1200 nanometer.

In at least one embodiment of the present application, the input sensing region 200 directly faces a light emitting region of the location sensing device 40. In other embodiments, the input sensing region 200 (as shown in FIG. 13) may be displaced to be angled with an upper surface of the input terminal apparatus 1.

The input terminal apparatus 1 further includes the optical component 106. The optical component 106 is configured to reflect the light of the display image and form the aerial image upon the input terminal apparatus 1.

The input terminal apparatus 1 further includes the display device 50. The display device 50 is configured to display image. The displayed image may be form the aerial image upon the input terminal apparatus 1 by the optical component 106, for achieving an aerial touch by the user. In at least one embodiment of the present application, the aerial image is parallel with the input sensing region 200, and is adjacent to the input terminal apparatus 1.

The processor 102 further locates a touch position of an occlusion object S in the input sensing region 200 according to the optical path image outputted by the location sensing device 40. In at least one embodiment of the present application, the occlusion object S may be fingers or a touch pen, and so on, not being limited.

Figure 14:
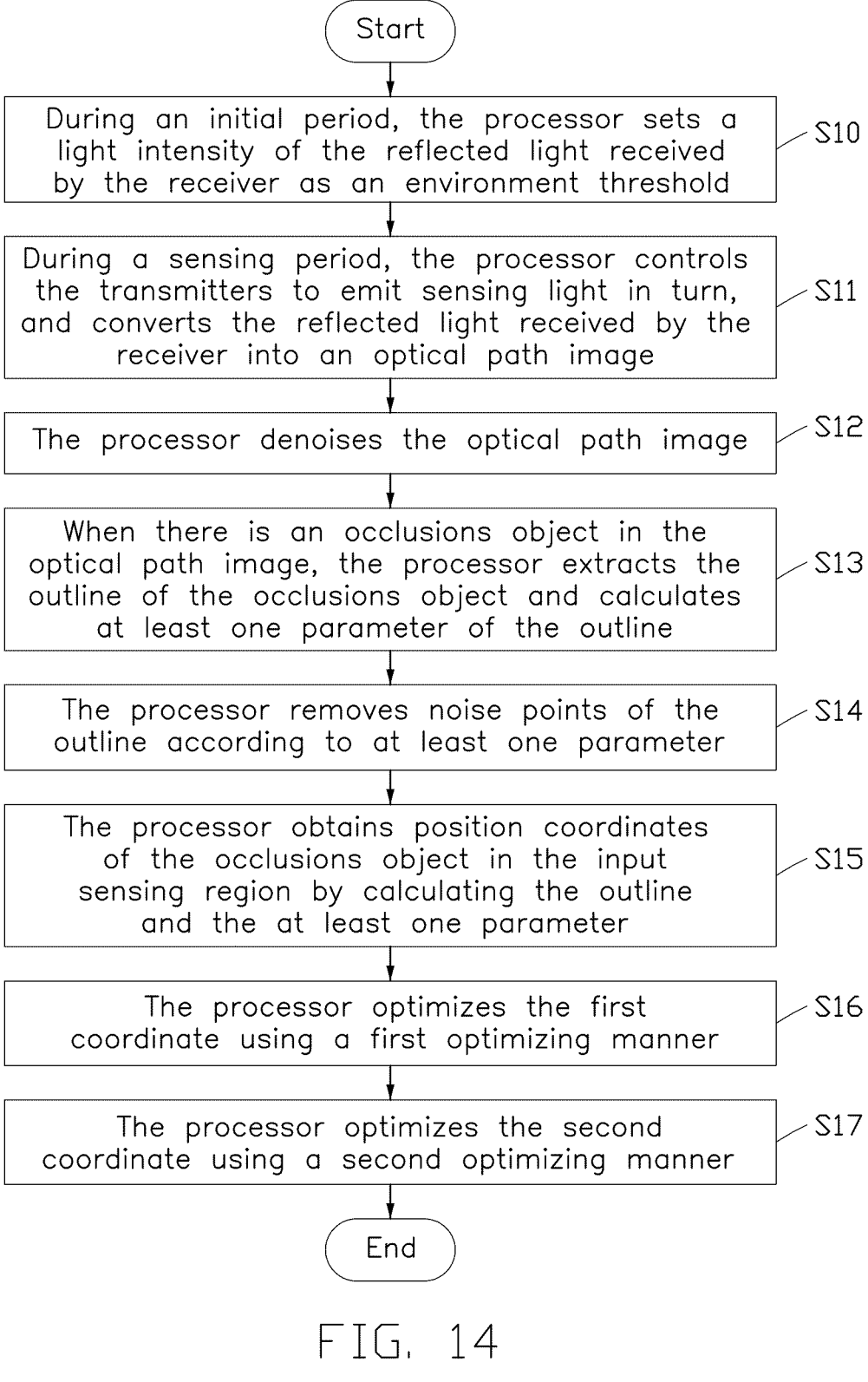
FIG. 14 is a flowchart illustrating an embodiment of a location sensing method according to the present application.

Referring to FIG. 14, it is a flowchart of the location sensing method. The location sensing method includes the following blocks.

In block S10, during an initial period, the processor 102 sets a light intensity of the reflected light received by the receiver 4311 as an environment threshold.

In block S11, during a sensing period, the processor 102 controls the transmitters 4312 to emit sensing light in turn, and converts the reflected light received by the receivers 4311 into the optical path image.

Figure 15:
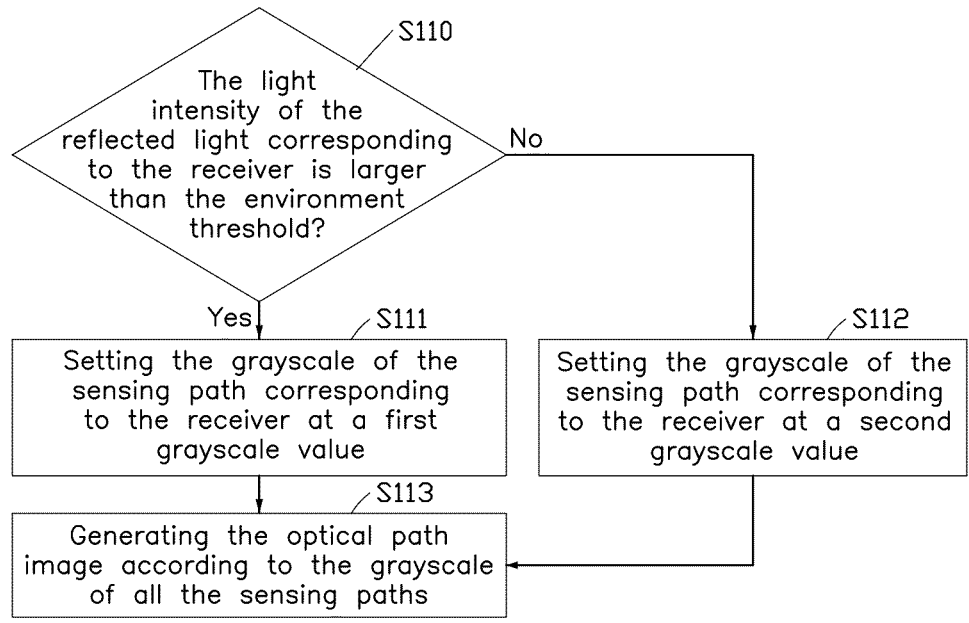
FIG. 15 is a detail flowchart of the block S11 of FIG. 14.

Referring to FIG. 15, in at least one embodiment of the present application, the block of the processor 102 control the transmitters 4312 to emit the sensing light in turn, and converts the reflected light received by the receivers 4311 into the optical path image includes:

In block S110, it determines that whether the light intensity of the reflected light received by the receiver 4311 is larger than the environment threshold.

In block S111, when the light intensity of the reflected light received by the receiver 4311 is larger than the environment threshold, it determines that there is an occlusion object S in a sensing path corresponding to the receiver 4311, the processor 102 sets the grayscale of the corresponding sensing path at a first grayscale value.

In block S112, when the light intensity of the reflected light received by the receiver 4311 is less than or equal to the environment threshold, it determines that there no occlusion object S in the sensing path corresponding to the receiver 4311, the processor 102 set the grayscale of the corresponding sensing path at a second grayscale value.

In block S113, the processor 102 generates the optical path image according to the grayscale of all the sensing paths.

In block S12, the processor 102 denoises the optical path image.

In at least one embodiment of the present application, the processor 102 denoises the optical path image by manners of erosion, expansion, Gaussian Blur, and so on, for optimizing the optical path image.

In block S13, when there is the occlusion object S in the optical path image, the processor 102 extracts the outline of the occlusion object S and calculates at least one parameter of the outline.

The processor 102 serves the outline surrounded by the first grayscale in the optical path image as the outline of the occlusion object S. In at least one embodiment of the present application, the at least one parameter may include an area, a barycenter, and a center of the outline.

In block S14, the processor 102 removes noise points of the outline according to the at least one parameter.

In block S15, the processor 102 obtains position coordinates of the occlusion object S in the input sensing region 200 by calculating the outline and the at least one parameter.

In at least one embodiment of the present application, the processor 102 establishes a coordinate system with the first direction X as a horizontal axis and the second direction Y as a vertical axis. In that means, the transmitters 4312 and the receivers 4311 are set along the horizontal axis, and the transmitters 412 emits the sensing light along the vertical axis. The coordinates of the occlusion object S include a first coordinate along the first direction X and a second coordinate along the second direction Y. The second coordinate is a height of the occlusion object S upon the input terminal apparatus 1.

In block S16, the processor 102 optimizes the first coordinate of the occlusion object S using a first optimizing manner.

Figure 16:
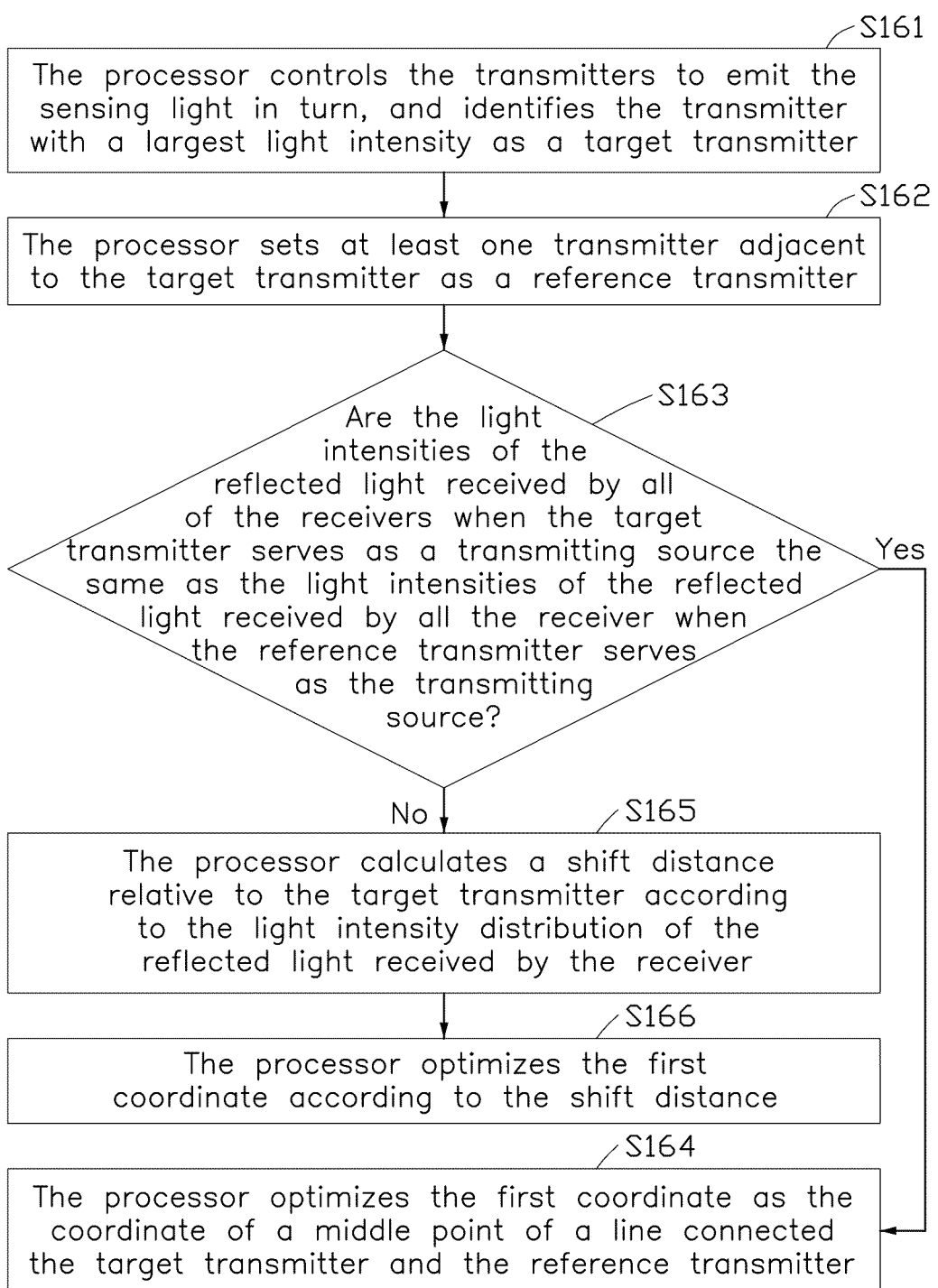
FIG. 16 is a detail flowchart of the block S16 of FIG. 14.
Figure 18:
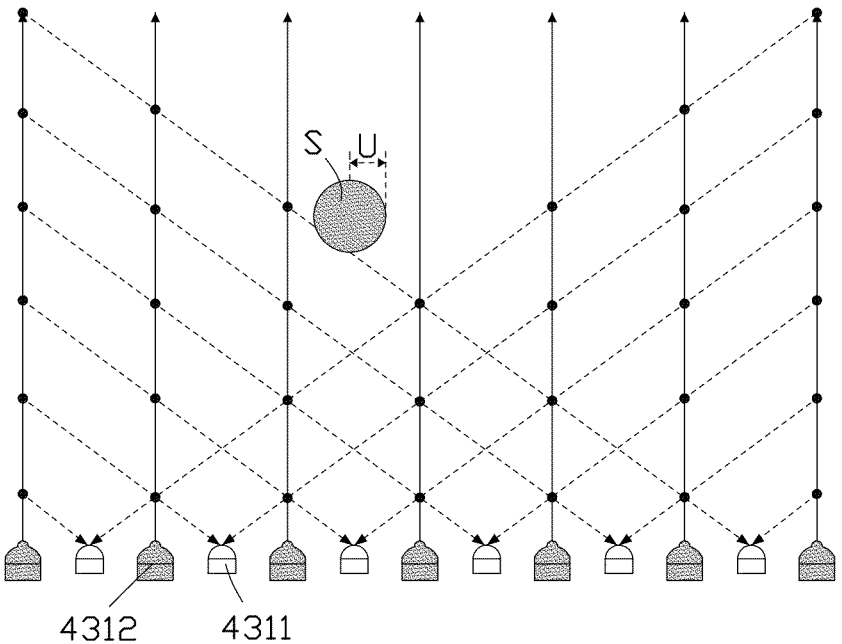
FIG. 18 is a diagram illustrating a second embodiment of the position of the occlusion object and the light intensity of the receivers.

Referring to FIGS. 16-18, FIG. 16 is a detail flowchart of the block S16. FIG. 17 is a first embodiment of the position of the occlusion object S and the light intensity of the receiver 4311 using different transmitters 4312 as the light source. FIG. 18 is a second embodiment of the position of the occlusion object S and the light intensity of the receiver 4311. In the first embodiment of the present application, the block of the processor 102 optimizes the first coordinate of the occlusion object S using the first optimizing manner includes:

In block S161, the processor 102 controls the transmitters 4312 to emit the sensing light in turn, and identifiers the transmitter 4312 corresponding to the receiver 4311 with a largest light intensity as a target transmitter.

In block S162, the processor 102 sets at least one transmitter 4312 adjacent to the target transmitter as a reference transmitter.

In block S163, the processor 102 determines that whether the light intensities of the reflected light received by all of the receivers 4311 when the target transmitter serves as a transmitting source are the same as the light intensities of the reflected light received by all the receivers 4311 when the reference transmitter serves as the transmitting source.

In block S164, when the light intensities of the reflected light received by all of the receivers 4311 when the target transmitter serves as a transmitting source are the same as the light intensities of the reflected light received by all the receivers 4311 when the reference transmitter serves as the transmitting source (as shown in FIG. 17), it determines that the occlusion object S is disposed between the target transmitter and the reference transmitter, and evenly distanced to the target transmitter and the reference transmitter, the processor 102 optimizes the first coordinate as the coordinate of a middle point of a line connected between the target transmitter and the reference transmitter.

In block S165, when the light intensities of the reflected light received by all of the receivers 4311 when the target transmitter serves as a transmitting source are not the same as the light intensities of the reflected light received by all the receivers 4311 when the reference transmitter serves as the transmitting source (as shown in FIG. 18), the processor 102 calculates a shift distance U relative to the target transmitter according to the light intensity distribution of the reflected light received by the receiver 4311.

In block S166, the processor 120 optimizes the first coordinate according to the shift distance U.

In at least one embodiment of the present application, the processor 102 serves a difference between the coordinate of the middle point and the shift distance U as the optimized first coordinate. The reference transmitter is the transmitter 4312 in the two adjacent transmitters 4312, which corresponds to the receiver 4311 with a largest light intensity.

In block S17, the processor 102 optimizes the second coordinate of the occlusion object S using a second optimizing manner.

Figure 20:
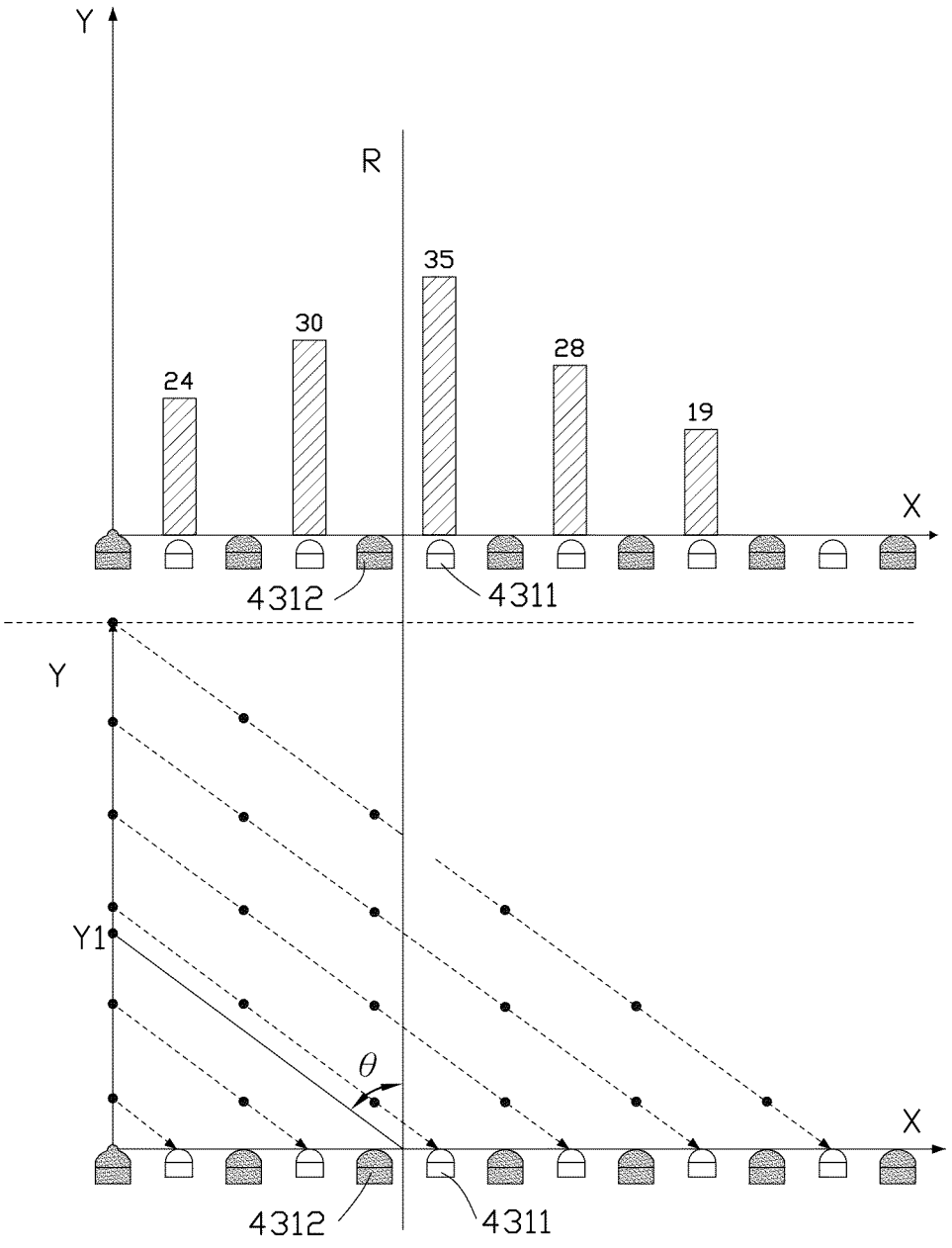
FIG. 20 is a diagram illustrating the light intensity, the reference axis, the predefined angle, and the optimized second coordinate of the different receivers of FIG. 19.

Referring to FIGS. 19 and 20, FIG. 19 is a detail flowchart of the block S17. FIG. 20 is diagram illustrating the light intensity, a reference axis, the predefined angle R, and the optimized second coordinate of the different receivers 4311. In the first embodiment of the present application, the block of the processor 102 optimizes the second coordinate of the occlusion object S using the second optimizing manner includes:

In block S171, the processor 102 sets one transmitter 4312 as the target transmitter and controls the target transmitter to emit the sensing light.

In block S172, the processor 120 identifies one receiver 4311 with a largest light intensity as a main receiver, and sets at least two receivers 4311 adjacent to the main receiver as reference receivers.

In block S173, the processor 102 calculates a weighted average value of the light intensity corresponding to the main receiver and the reference receivers to obtain a reference axis R. The reference axis R is parallel to the second direction Y.

In block S174, the processor 102 serves a junction of an extending line of the reference axis R along a predetermined angle θ and the sensing light emitted by the target transmitter as the second coordinate Y1 of the occlusions object S.

In at least one embodiment of the present application, the predefined angle θ is a field angle. The predefined angle may be adjusted in an angle range. The angle range is from 10° to 40°.

The above location sensing method and the input terminal apparatus 1 optimizes the position coordinates of the occlusion object S by adjusting the cooperation relationship between the transmitters and the receivers along the first direction X and the second direction Y respectively, for improving a resolution ratio and a sensing height of the input terminal apparatus 1, therefore an accuracy of the position coordinates of the occlusion object S is improved.

Those skilled in the art will recognize that the above described embodiments are only intended to illustrate the invention and are not intended to limit the invention, and numerous possible modifications and variations within the spirit of the invention will fall within the scope of the invention.

What is claimed is:

1. A location sensing method, used in an input terminal apparatus; the input terminal apparatus comprises a location sensing device and a processor; the location sensing device forms an input sensing region upon the input terminal apparatus; the location sensing device comprises a plurality of transmitters and a plurality of receivers; along a first direction, the transmitters and the receivers are alternately disposed in a predefined interval; the processor is electrically connected with the location sensing device; wherein the location sensing method comprises:

during an initial period, the processor sets a light intensity of the reflected light received by the receiver as an environment threshold;

during a sensing period, the processor controls the transmitters to emit sensing light along a second direction perpendicular to the first direction in turn, and converts the reflected light received by the receivers into an optical path image;

the processor denoises the optical path image;

the processor extracts an outline of the occlusion object and calculates at least one parameter of the outline when there is an occlusion object in the optical path image;

the processor removes noise points of the outline according to at least one parameter;

the processor obtains position coordinates of an occlusion object in the input sensing region by calculating the outline and the at least one parameter; the position coordinates are the first coordinate along the first direction and a second coordinate along the second direction;

the processor optimizes the first coordinate using a first optimizing manner; in the first optimizing manner, the first coordinate is optimized by analyzing the light intensity received by the corresponding receiver while at least two transmitters serve as transmitter source respectively; and the processor optimizes the second coordinate using a second optimizing manner; in the second optimizing manner, the second coordinate is optimized by analyzing the light intensity received by two adjacent receivers while one of the transmitters serves as the transmitter source.

2. The location sensing method of claim 1, wherein the predefined interval is in a range from 1 millimeter to 20 millimeter.

3. The location sensing method of claim 1, wherein the step of the processor controls the transmitters to emit the sensing light in turn comprises:

determining whether a light intensity of the reflected light received by the receiver is larger than the environment threshold;

when the light intensity of the reflected light is larger than the environment threshold, it determines that there is the occlusion object in a sensing path corresponding to the receiver, the processor sets a grayscale of the sensing path at a first grayscale value;

when the light intensity of the reflected light is less than or equal to the environment threshold, it determines that there is no occlusion object in the sensing path corresponding to the receiver, the processor set a grayscale of the sensing path at a second grayscale value; and the processor generates the optical path image according to the grayscale of all the sensing paths.

4. The location sensing method of claim 1, wherein the step of the processor optimizes the first coordinate using the first optimizing manner comprises:

the processor controls the transmitters to emit the sensing light orderly, and identifies the transmitter with a largest light intensity as a target transmitter;

the processor sets at least one transmitter adjacent to the target transmitter as a reference transmitter;

the processor determines that whether the light intensities of the reflected light received by all of the receivers when the target transmitter serves as a transmitting source are the same as the light intensities of the reflected light received by all the receivers when the reference transmitter serves as the transmitting source;

when the light intensities of the reflected light received by all of the receivers when the target transmitter serves as a transmitting source are the same as the light intensities of the reflected light received by all the receivers when the reference transmitter serves as the transmitting source, the processor optimizes the first coordinate as a coordinate of a midpoint of a line connected the target transmitter and the reference transmitter;

when the light intensities of the reflected light received by all of the receivers when the target transmitter serves as a transmitting source are not the same as the light intensities of the reflected light received by all the receivers when the reference transmitter serves as the transmitting source the processor calculates a shift distance relative to the target transmitter according to the light intensity distribution of the reflected light received by the receiver; and the processor optimizes the first coordinate according to the shift distance.

5. The location sensing method of claim 1, wherein the step of optimizes the second coordinate using the second optimizing manner comprises:

the processor sets one of the transmitters as the target transmitter and controls the target transmitter to emit the sensing light;

the processor identifies one receiver with a largest light intensity as a main receiver, and sets at least two receivers adjacent to the main receiver as reference receivers;

the processor calculates a weighted average value of the light intensity corresponding to the main receiver and the reference receivers to obtain a reference axis; and the processor serves a junction of an extending line of the reference axis along a predetermined angle and the sensing light emitted by the target transmitter as the second coordinate of the occlusions object.

6. The location sensing method of claim 5, wherein a wavelength of the sensing light is 940 nanometer.

7. The location sensing method of claim 1, wherein the predefined angle is a field angle; an angle range of the predefined angle is from 10° to 40°.

8. An input terminal apparatus comprises a location sensing device and a processor; the location sensing device forms an input sensing region upon the input terminal apparatus; the location sensing device comprises a plurality of transmitters and a plurality of receivers; along a first direction, the transmitters and the receivers are alternately disposed in a predefined interval; the processor is electrically connected with the location sensing device; wherein during an initial period, the processor sets a light intensity of the reflected light received by the receiver as an environment threshold; during a sensing period, the processor controls the transmitters to emit sensing light along a second direction perpendicular to the first direction in turn, and converts the reflected light received by the receivers into an optical path image; the processor denoises the optical path image; the processor extracts an outline of the occlusion object and calculates at least one parameter of the outline when there is an occlusion object in the optical path image; the processor removes noise points of the outline according to at least one parameter; the processor obtains position coordinates of the occlusion object in the input sensing region by calculating the outline and the at least one parameter; the position coordinates are the first coordinate along the first direction and a second coordinate along the second direction; the processor optimizes the first coordinate using a first optimizing manner; in the first optimizing manner, the first coordinate is optimized by analyzing the light intensity received by the corresponding receiver while at least two transmitters serve as transmitter source respectively; the processor optimizes the second coordinate using a second optimizing manner; in the second optimizing manner, the second coordinate is optimized by analyzing the light intensity received by two adjacent receivers while one of the transmitters serves as the transmitter source.

9. The input terminal apparatus of claim 8, wherein the processor controls the transmitters to emit the sensing light orderly, and identifies the transmitter with a largest light intensity as a target transmitter; the processor sets at least one transmitter adjacent to the target transmitter as a reference transmitter; the processor determines that whether the light intensities of the reflected light received by all of the receivers when the target transmitter serves as a transmitting source are the same as the light intensities of the reflected light received by all the receivers when the reference transmitter serves as the transmitting source; when the light intensities of the reflected light received by all of the receivers when the target transmitter serves as a transmitting source are the same as the light intensities of the reflected light received by all the receivers when the reference transmitter serves as the transmitting source, the processor optimizes the first coordinate as a coordinate of a midpoint of a line connected the target transmitter and the reference transmitter; when the light intensities of the reflected light received by all of the receivers when the target transmitter serves as a transmitting source are not the same as the light intensities of the reflected light received by all the receivers when the reference transmitter serves as the transmitting source the processor calculates a shift distance relative to the target transmitter according to the light intensity distribution of the reflected light received by the receiver; the processor optimizes the first coordinate according to the shift distance.

10. The input terminal apparatus of claim 8, wherein the processor sets one of the transmitters as the target transmitter and controls the target transmitter to emit the sensing light; the processor identifies one receiver with a largest light intensity as a main receiver, and sets at least two receivers adjacent to the main receiver as reference receivers; the processor calculates a weighted average value of the light intensity corresponding to the main receiver and the reference receivers to obtain a reference axis; the processor serves a junction of an extending line of the reference axis along a predetermined angle and the sensing light emitted by the target transmitter as the second coordinate of the occlusions object.

11. The input terminal apparatus of claim 8, wherein the input terminal device comprises an upper shell, a lower shell fixed with the upper shell, an optical component, a main board, a location sensing device, and a display device; the optical component and the location sensing device are received in the upper shell, the main board and the display device are received in the lower shell; the optical component reflects the light emitted by the display device to be upon the input terminal apparatus for forming an aerial display region; wherein the location sensing device uses the location sensing device is disposed in the input terminal apparatus, sensing light emitted by the location sensing device form a input sensing region upon the aerial display region; wherein the location sensing device senses a position of an touch operation in the input sensing region and an advancing depth; the location sensing device comprises at least one first sensing structure and a second sensing structure; the at least one first sensing structure and the second sensing structure are electrically connected with a main board of the input terminal apparatus; the at least one first sensing structure is disposed upon the second sensing structure; the at least one first sensing structure and the second sensing structure generate sensing signals when the touch operation in the input sensing region exist; the main board receives, determines the advancing depth along a direction perpendicular to the input sensing region according to the sensing signals of the at least first sensing structure and the second sensing structure, and identifies a touch position in the input sensing region according to the sensing signals of the second sensing structure, for achieving a three-dimension sensing of the touch operation; the main board further configured to generate corresponding control signal according to the identified using state, for controlling the display device to adjust the displayed image in the aerial display region.

12. A location sensing device used in an input terminal apparatus with an aerial display region; the location sensing device is disposed in the input terminal apparatus, sensing light emitted by the location sensing device form a input sensing region upon the aerial display region; wherein the location sensing device senses a position and an advancing depth of an touch operation in the input sensing region; the location sensing device comprises at least one first sensing structure and a second sensing structure; the at least one first sensing structure and the second sensing structure are electrically connected with a main board of the input terminal apparatus; the at least one first sensing structure is disposed upon the second sensing structure; the at least one first sensing structure and the second sensing structure generate sensing signals when the touch operation in the input sensing region exist; the main board receives, determines the advancing depth along a direction perpendicular to the input sensing region according to the sensing signals of the at least first sensing structure and the second sensing structure, and identifies a touch position in the input sensing region according to the sensing signals of the second sensing structure, for achieving a three-dimension sensing of the touch operation; wherein the location sensing device further comprises two first sensing structures; the first sensing structures clamps the second sensing structure therebetween; the sensing light emitted by the first sensing structures form a first sub-region and a third sub-region upon the aerial display region respectively; the sensing light emitted by the second sensing structure forms a second sub-region; the second sub-region is disposed between the first and third sub-regions being parallel with each other; the first sub-region, the third sub-region, and the second sub-region are further parallel with the first sensing structures and the second sensing structure; when merely receiving the sensing signals of the upon first sensing structure, the main board identifies the using state of the user to be a pre-touch state; in the pre-touch state, the aerial display region fails to be touched; when receiving the sensing signals of the upon first sensing structure and the second sensing structure, the main board identifies the using state of the user to be a touch input state; when receiving the sensing signals of the two first sensing structures and the second sensing structure, the main board identifies the using state of the user to be a false triggering prompt state, in the false triggering prompt state, a plurality of positions in the second sub-region being false triggered.

13. The location sensing device of claim 12, wherein both of the first sensing structure and the second sensing structure comprises a base, a lens portion, a plurality of transmitters, and a plurality of receivers; the transmitters and the receivers are alternately disposed on the base in a first interval.

14. The location sensing device of claim 12, wherein the second sensing structure comprises a base, a lens portion, a plurality of transmitters, and a plurality of receivers; the transmitters and the receivers are alternately disposed on the base in a first interval; the first sensing structure comprises a base, a plurality of transmitters, and a plurality of receivers; the transmitters and the receivers are alternately disposed on the base in a second interval; the second interval is larger than the first interval.

15. The location sensing device of claim 12, wherein the first sensing structure emits the sensing light in a first pulse frequency; the second sensing structure emits the sensing light in a second pulse frequency; the first pulse frequency is larger than the second pulse frequency; the main board identifies the sensing signals of the first sensing structure and the second sensing structure according to a frequency of the sensing signal.

16. The location sensing device of claim 13, wherein the lens portion comprises a plurality of cylindrical lenses; the cylindrical lenses are disposed in a line; a central axis of the transmitters is overlapped with a central axis of the lens portion; a central axis of the receiver is evenly spaced to central axis of two adjacent cylindrical lenses.

* * * * *